March 7, 1961 G. V. MORRIS 2,974,305

SUBSCRIPTION TELEVISION COMPUTER

Filed Nov. 14, 1955 25 Sheets-Sheet 1

FIG. 1A
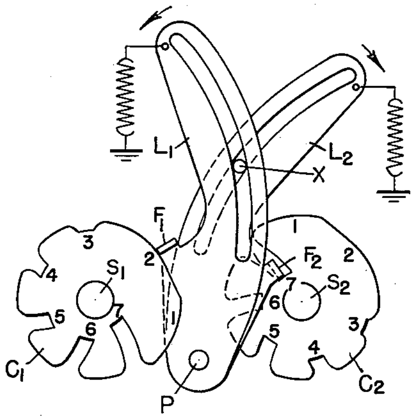
FIG. 1B
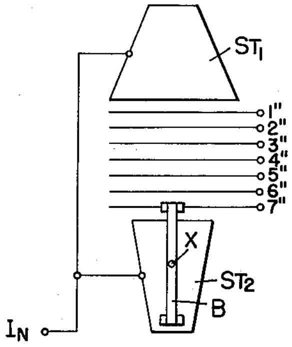
FIG. 25
| | | | | | |
|---|---|---|---|---|---|
| | | FIG. 3 | | FIG. 4 | |
| | FIG. 5 | FIG. 6 | FIG. 7 | FIG. 8 | |
| | FIG. 9 | FIG. 10 | FIG. 11 | FIG. 12 | |
| FIG. 13 | FIG. 14 | FIG. 15 | FIG. 16 | FIG. 17 | FIG. 18 |
| FIG. 19 | FIG. 20 | FIG. 21 | FIG. 22 | FIG. 23 | FIG. 24 |

March 7, 1961 G. V. MORRIS 2,974,305

SUBSCRIPTION TELEVISION COMPUTER

Filed Nov. 14, 1955 25 Sheets-Sheet 3

March 7, 1961 G. V. MORRIS 2,974,305

SUBSCRIPTION TELEVISION COMPUTER

Filed Nov. 14, 1955 25 Sheets-Sheet 7

March 7, 1961 G. V. MORRIS 2,974,305

SUBSCRIPTION TELEVISION COMPUTER

Filed Nov. 14, 1955 25 Sheets-Sheet 9

March 7, 1961 G. V. MORRIS 2,974,305

SUBSCRIPTION TELEVISION COMPUTER

Filed Nov. 14, 1955 25 Sheets-Sheet 10

March 7, 1961 G. V. MORRIS 2,974,305

SUBSCRIPTION TELEVISION COMPUTER

Filed Nov. 14, 1955 25 Sheets-Sheet 12

March 7, 1961 G. V. MORRIS 2,974,305

SUBSCRIPTION TELEVISION COMPUTER

Filed Nov. 14, 1955 25 Sheets-Sheet 15

March 7, 1961 G. V. MORRIS 2,974,305

SUBSCRIPTION TELEVISION COMPUTER

Filed Nov. 14, 1955 25 Sheets-Sheet 17

United States Patent Office
2,974,305
Patented Mar. 7, 1961

2,974,305

SUBSCRIPTION TELEVISION COMPUTER

George V. Morris, Chicago, Ill., assignor to Zenith Radio Corporation, a corporation of Delaware Filed Nov. 14, 1955, Ser. No. 546,592

18 Claims. (Cl. 340—147)

This invention relates in general to a computer for use in a subscription television service; more specifically, it pertains to a computer for determining the adjustment required for decoding mechanisms at subscriber receivers where the adjustment for any given subscriber is different from that of the others and where the adjustment for that same subscriber is also different for each program.

Subscription television systems have been proposed wherein the program signal is coded in accordance with a selected coding schedule at the transmitter, and wherein a key or coding signal indicative of the coding schedule is transmitted to subscriber receivers as a modulation component of the television signal itself or over any other air channel. Systems of this general type are disclosed and claimed, for example, in copending applications Serial No. 281,418, filed April 9, 1952, and issued July 15, 1958 as Patent 2,843,656, in the name of Morris et al.; Serial No. 326,107, filed December 15, 1952, and issued February 11, 1958 as Patent 2,832,252, in the name of Jack E. Bridges; and Serial No. 370,174, filed July 24, 1953, and issued October 27, 1959 as Patent 2,910,526, in the name of Walter S. Druz, all of which are assigned to the present assignee.

For maximum secrecy it is desirable that the air-borne coding signal, which may be picked up by anyone, be related to but not a direct manifestation of the coding schedule. Where such is the case, the air-borne coding signal may be said to have been itself coded and requires reading or interpretation before it can be used for decoding. In the arrangement of each of the aforementioned applications, the reading or interpretation of the air code signal may be achieved with a switching mechanism having a plurality of adjustable members, the relative adjustment of which establishes a particular pattern of circuit connections and determines the response of the decoding apparatus to the received coding signal. The switching mechanism of the decoder is individualized to each subscriber's receiver and, therefore, the switch setting required to permit one receiver to decode a given program is specifically different from that required for any other subscriber's receiver for the same program. Manifestly, unless the precise adjustment for a subscriber's individualized switching mechanism is known, proper decoding is virtually impossible. The necessary switch-setting information may be conveyed to subscribers from a central exchange in any of a number of ways, for example, verbally over a telephone link or by mail, and its dissemination affords a convenient measure of the charge to be assessed to subscribers predicated upon use of the service.

Since the switch-setting information is unique for each subscriber, a substantial problem of computation is presented in operating the system. The present invention meets that problem and provides a computer for determining the individualized switch setting information with speed, accuracy and facility.

Briefly, each subscriber decoder is assigned a multi-digit identification number which represents the distinguishing characteristics of its adjustable switching mechanism. That number is registered in the computer to establish circuitry that positively and completely identifies the characteristics of the switching mechanism in that decoder. A further number, representing a selected subscription program, is then registered in the computer and correlating circuitry responds to the registered numbers to determine the exact adjustment required for that decoding apparatus to decode the selected program.

It is, accordingly, an object of the present invention to provide an improved subscription television computer for determining the adjustment of subscriber decoding equipment to effect a given decoding pattern.

It is another object of the invention to provide a computer for determining the adjustment of a decoding mechanism having a plurality of operating positions each of which establishes a predetermined code condition.

It is a further object of the invention to provide a subscription television computer for determining the adjustment of a decoding mechanism having a plurality of operating positions which are correlated with a corresponding plurality of code conditions in accordance with a selected one of a relatively large number of possible correlation patterns.

It is an additional object to provide a subscription television computer for determining the adjustment of a decoding mechanism, assigned to a selected one of a relatively large number of subscribers, having a plurality of operating positions each of which establishes a predetermined code condition and having a number of distinguishing characteristics determining the correlation between the operation positions and code conditions.

It is still another object of the present invention to provide a subscription television computer for determining the adjustment for each of a relatively large number of decoding mechanisms for each of several different subscription television programs where each decoding mechanism is assigned to a different subscriber and has a set of distinguishing characteristics unique to the assigned subscriber such that the adjustment required for any given subscriber to establish a predetermined code condition in his assigned decoding mechanism is different from that required of the other subscribers to establish the same code condition, and where the adjustment for that same subscriber is also different to establish different code conditions for different programs.

A subscription television computer, constructed in accordance with the present invention, determines the adjustment of a decoding mechanism having a plurality of operating positions each of which establishes a predetermined code condition. It has means for providing information representing a selected code condition that must be established in the decoding mechanism to effect decoding of a given subscription television program, and also means for providing information representing the correlation between operating positions and code conditions of the decoding mechanism. The computer has control apparatus responsive to the information from both means for determining the particular operating position of the decoding mechanism required to establish the selected code condition.

The features of this invention which are believed to be new are set forth with particularity in the appended claims. The invention, together with further objects and advantages thereof, may best be understood, however, by reference to the following description in conjunction with the accompanying drawings, in which:

Figures 1A and 1B are functional diagrams of portions of the switching mechanism of Figure 1;

Figure 2:
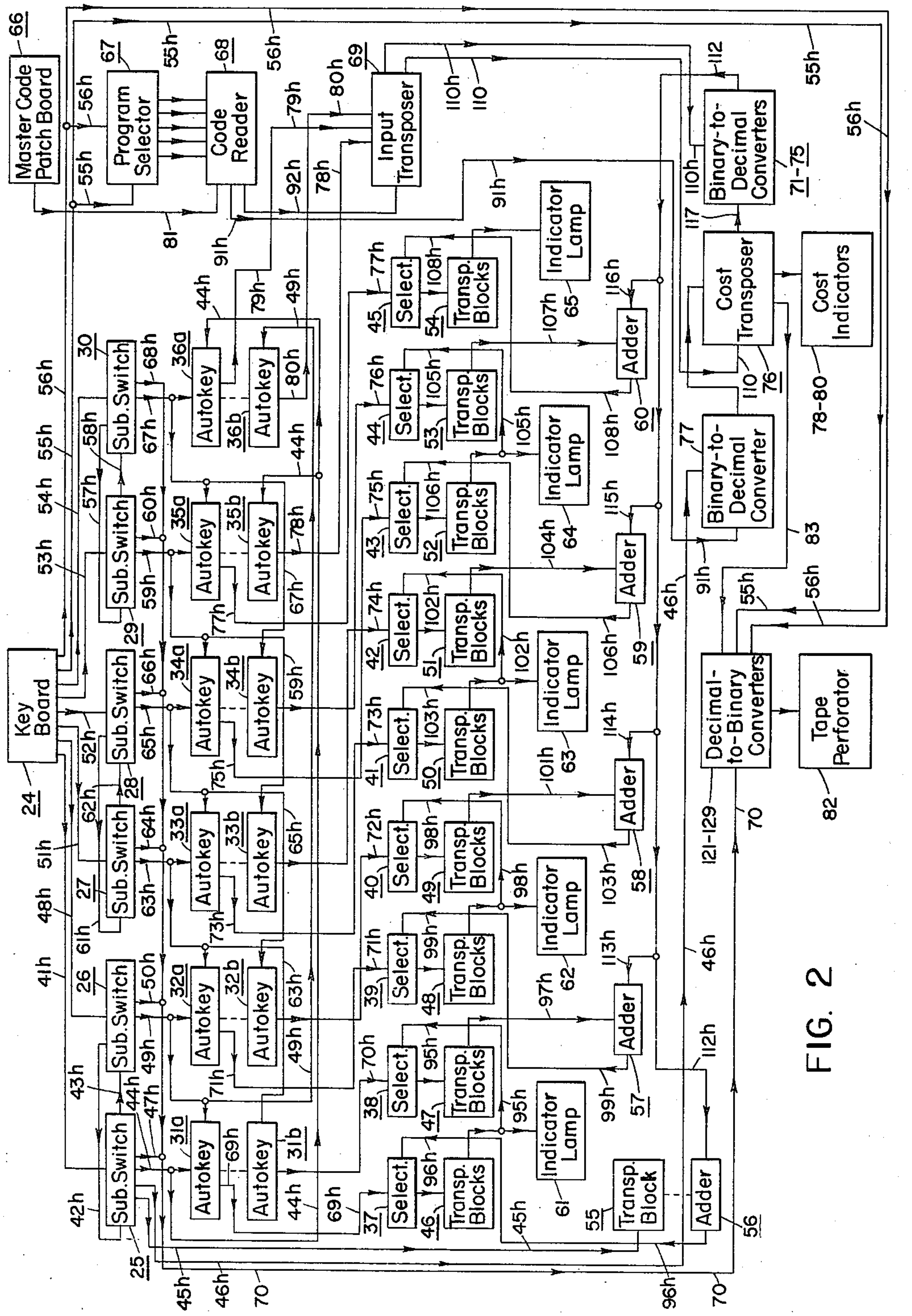
Figure 2 is a simplified block diagram of a computer embodying the invention.
Figure 3:
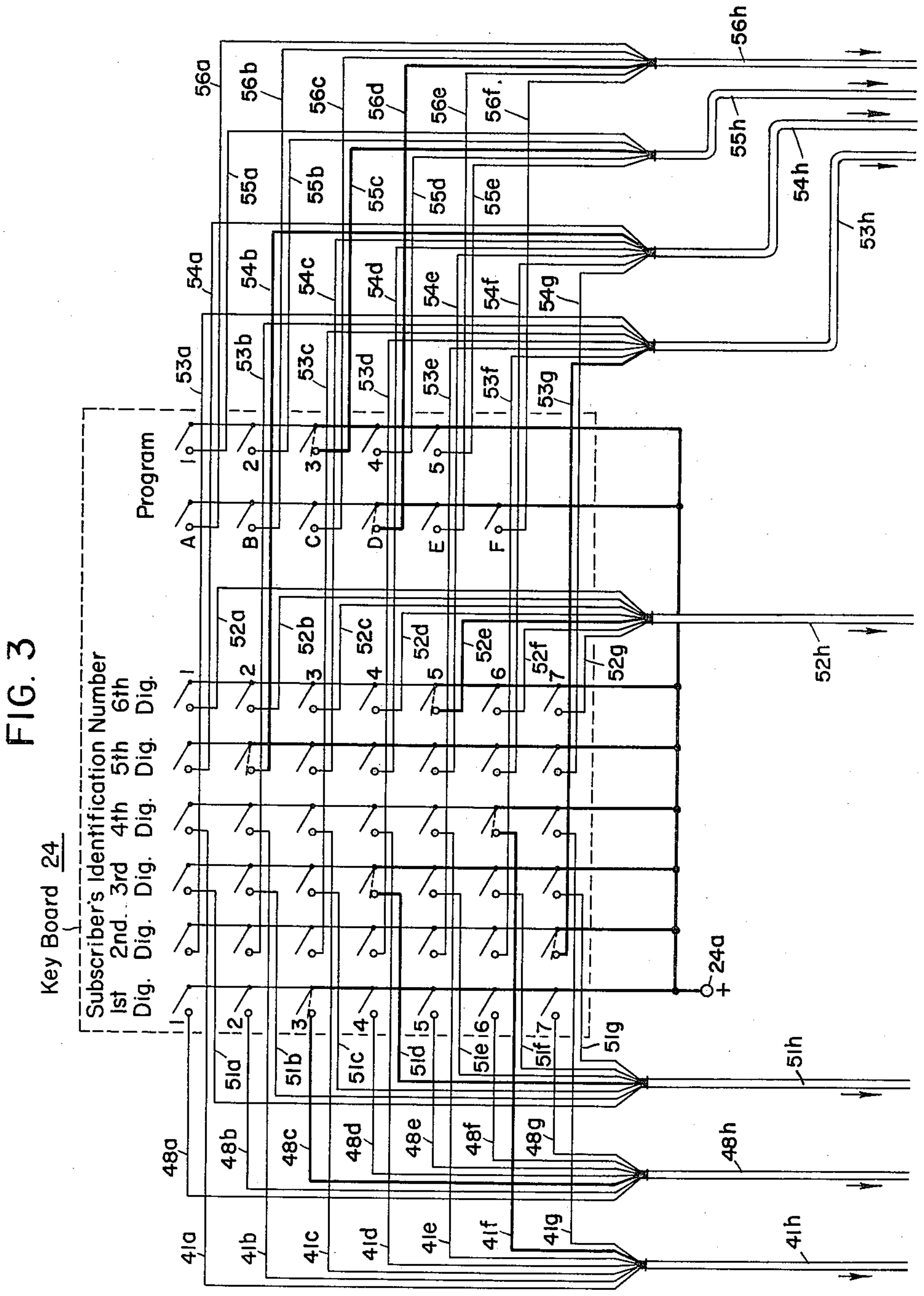
Figure 4:
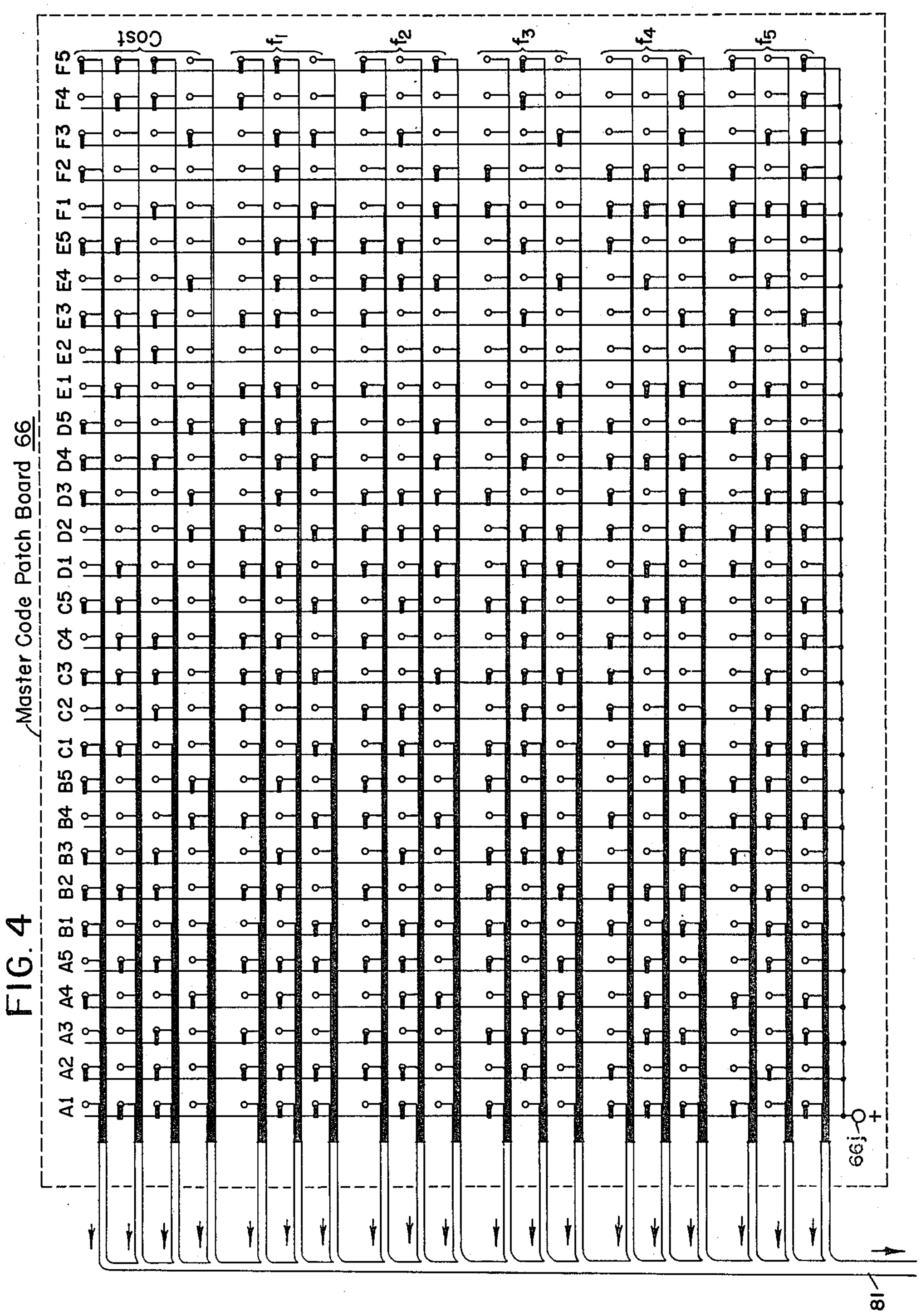
Figure 5:
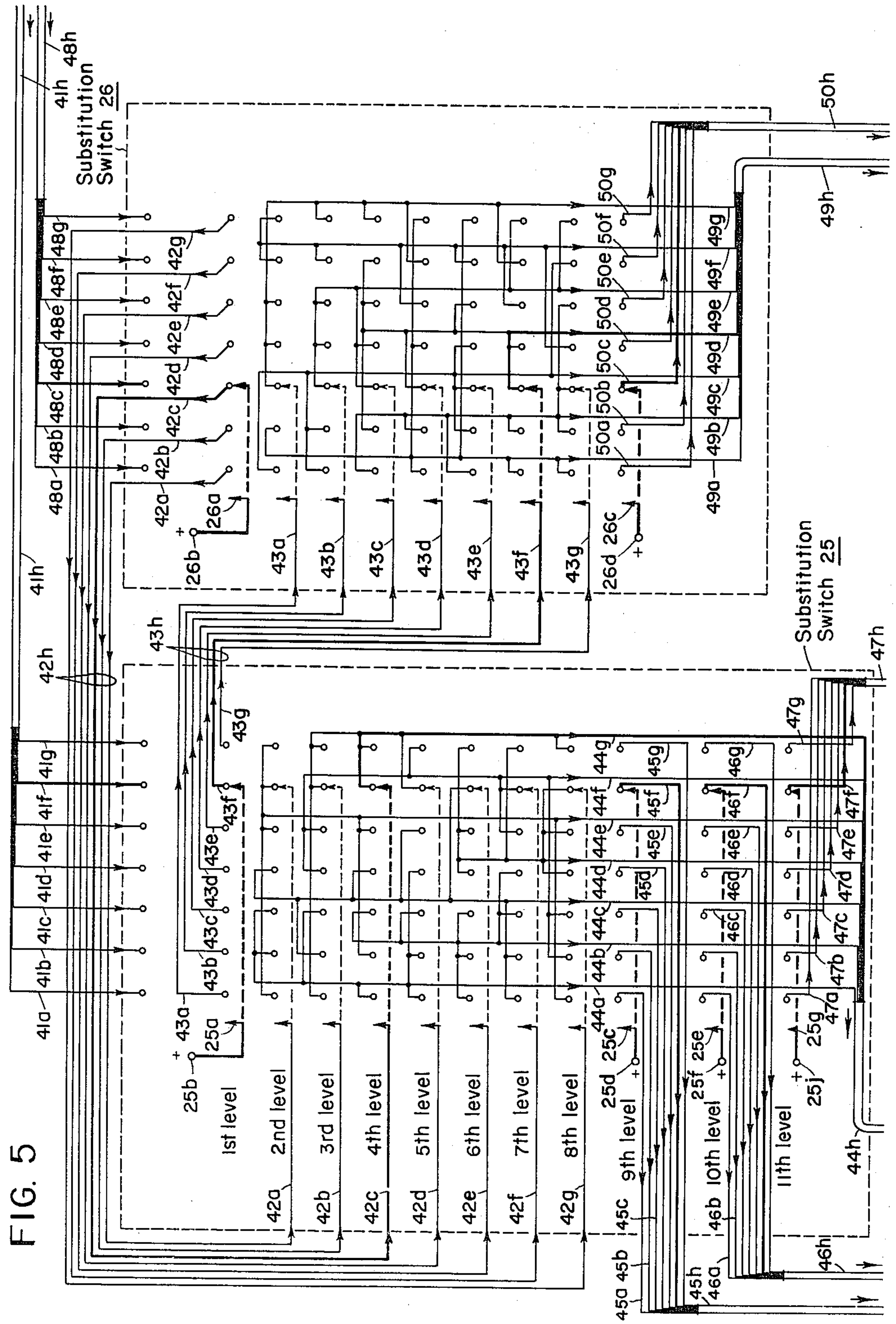
Figure 6:
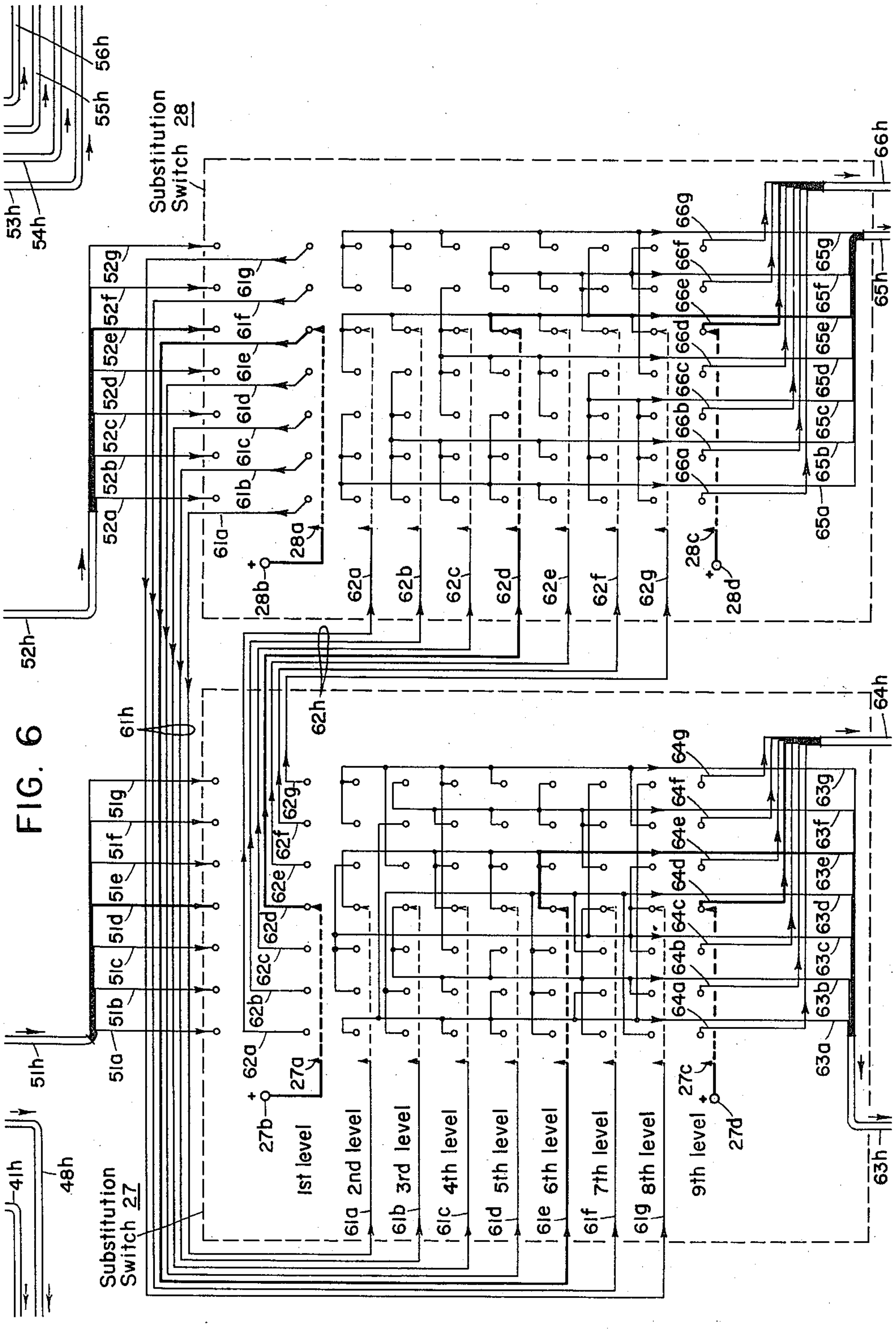
Figure 7:
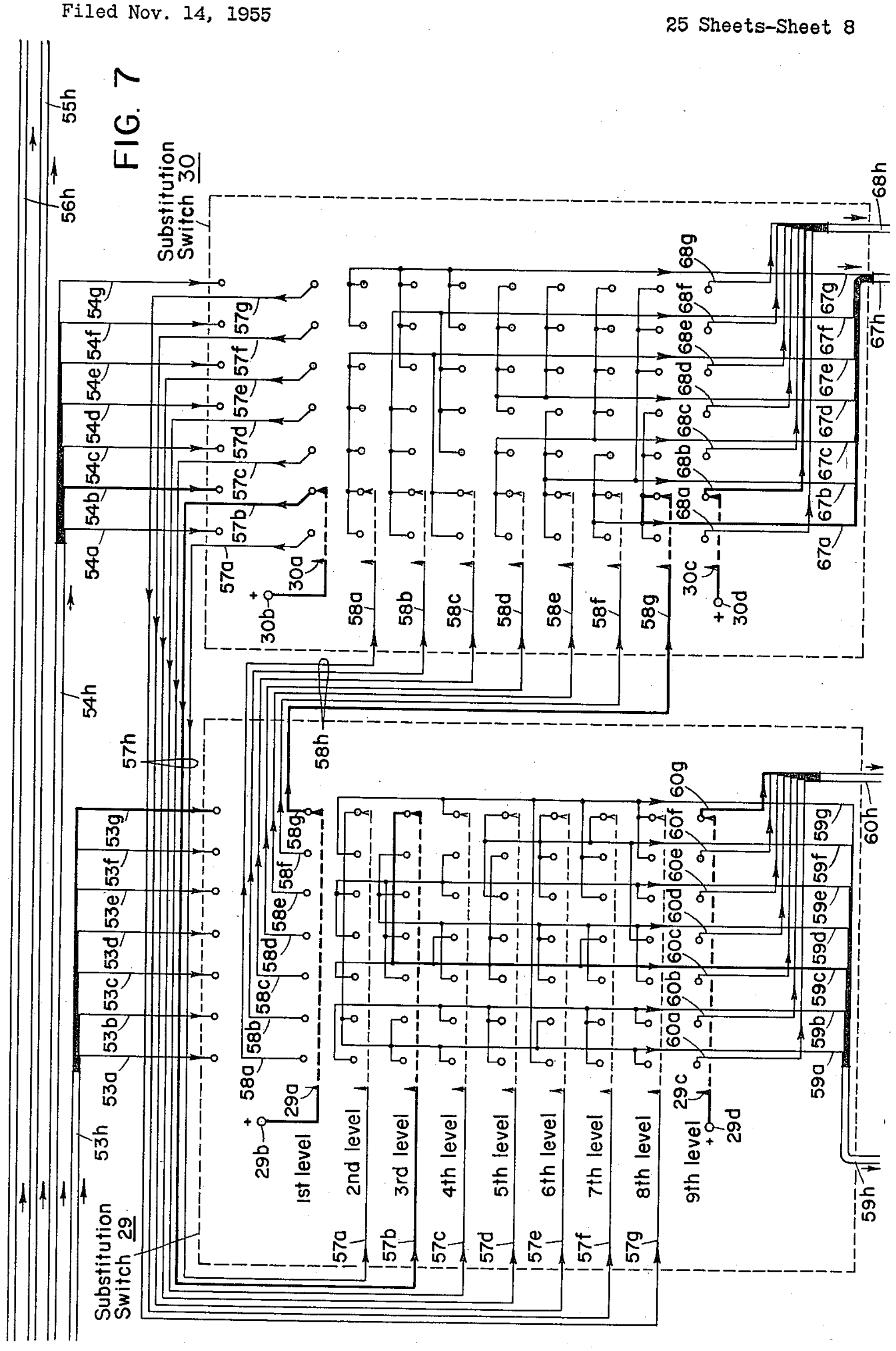
Figure 8:
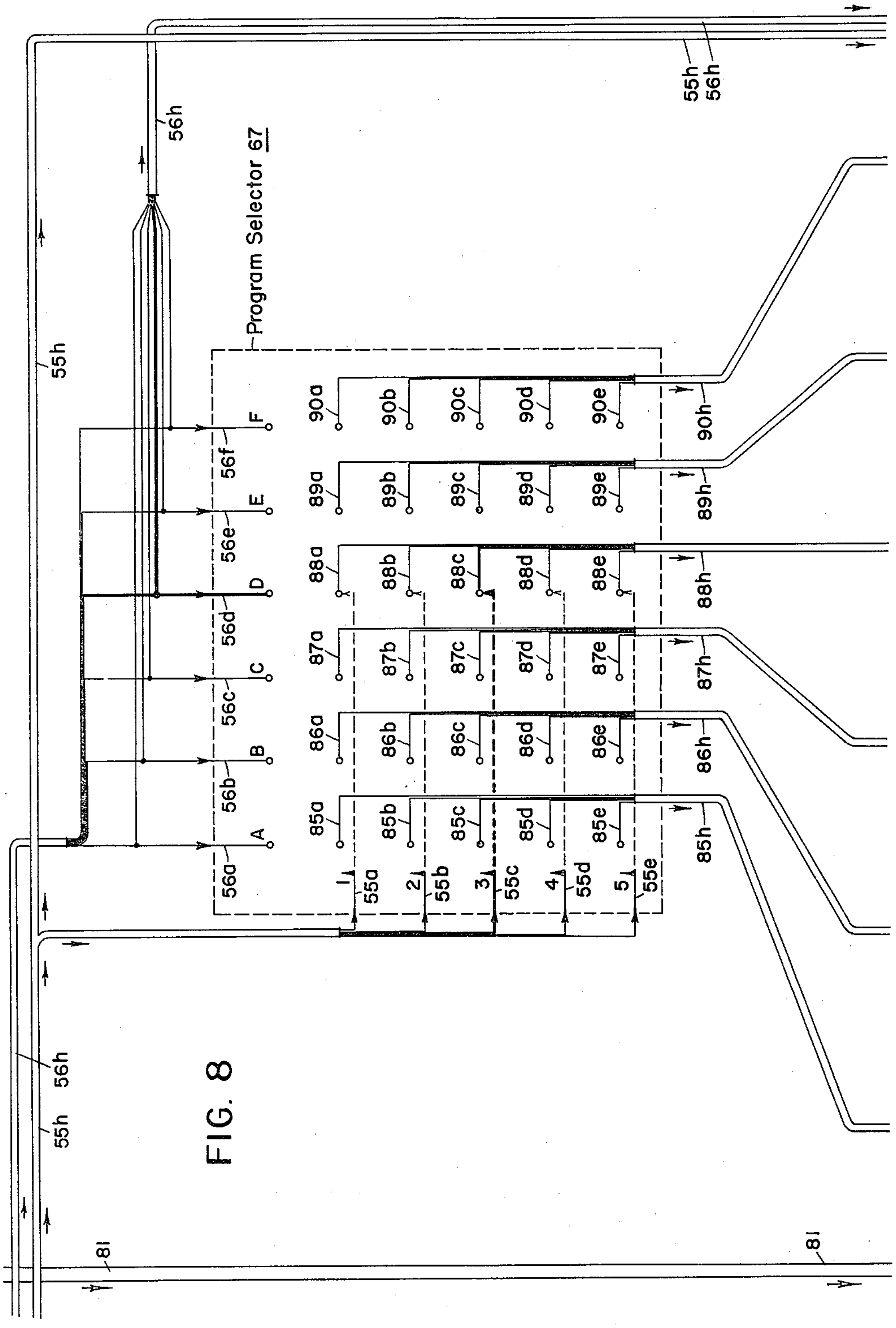
Figure 9:
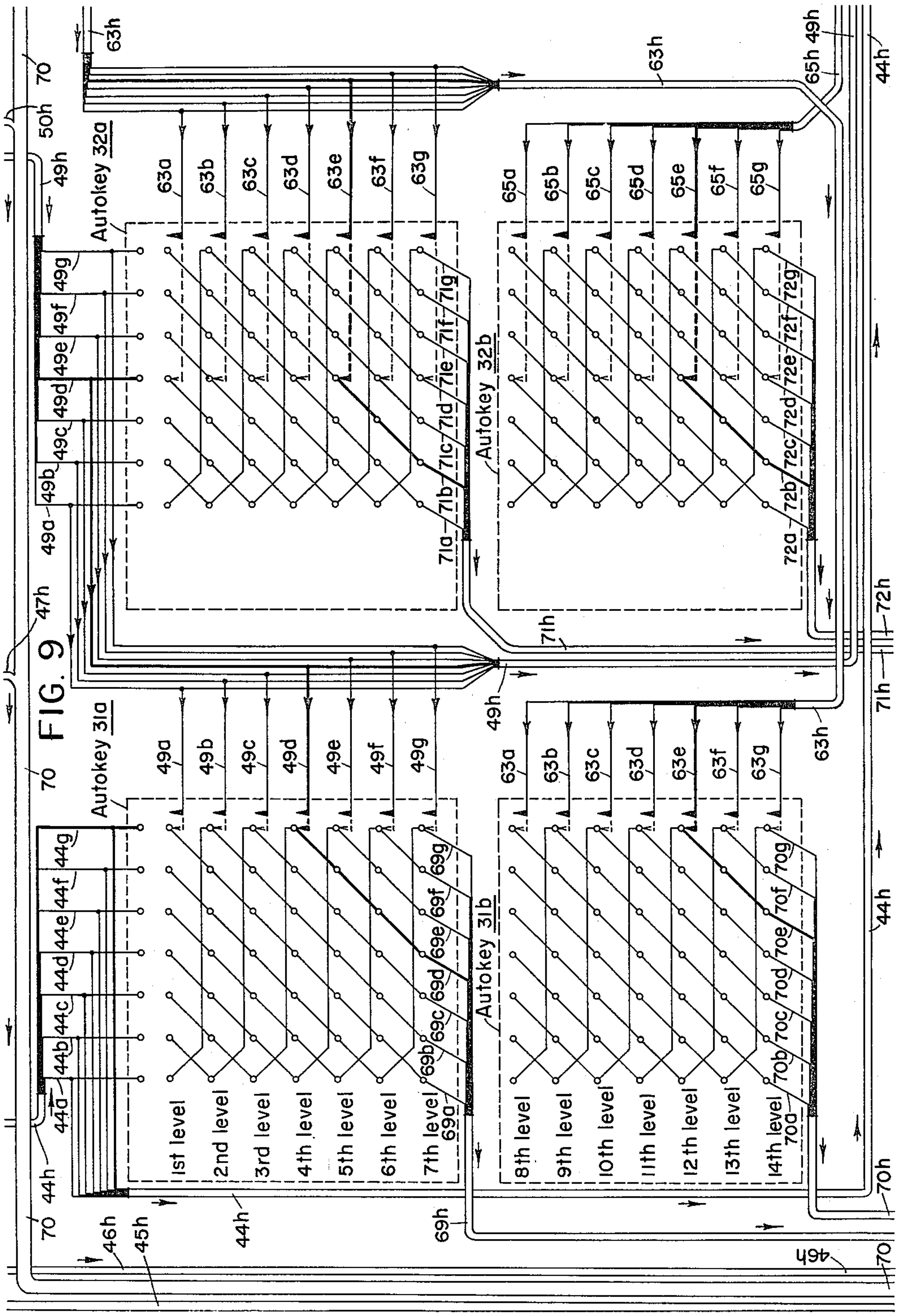
Figure 10:
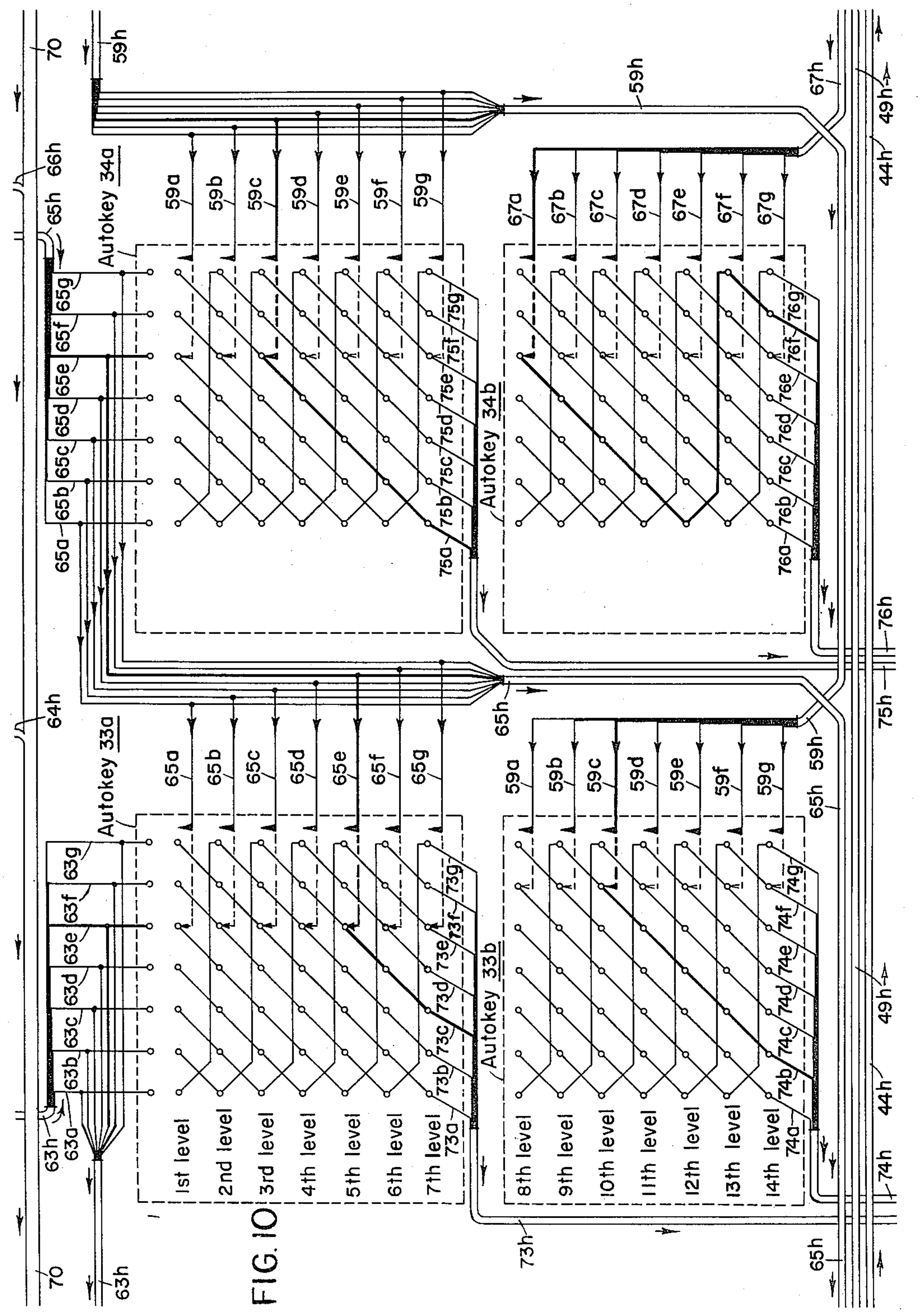
Figure 11:
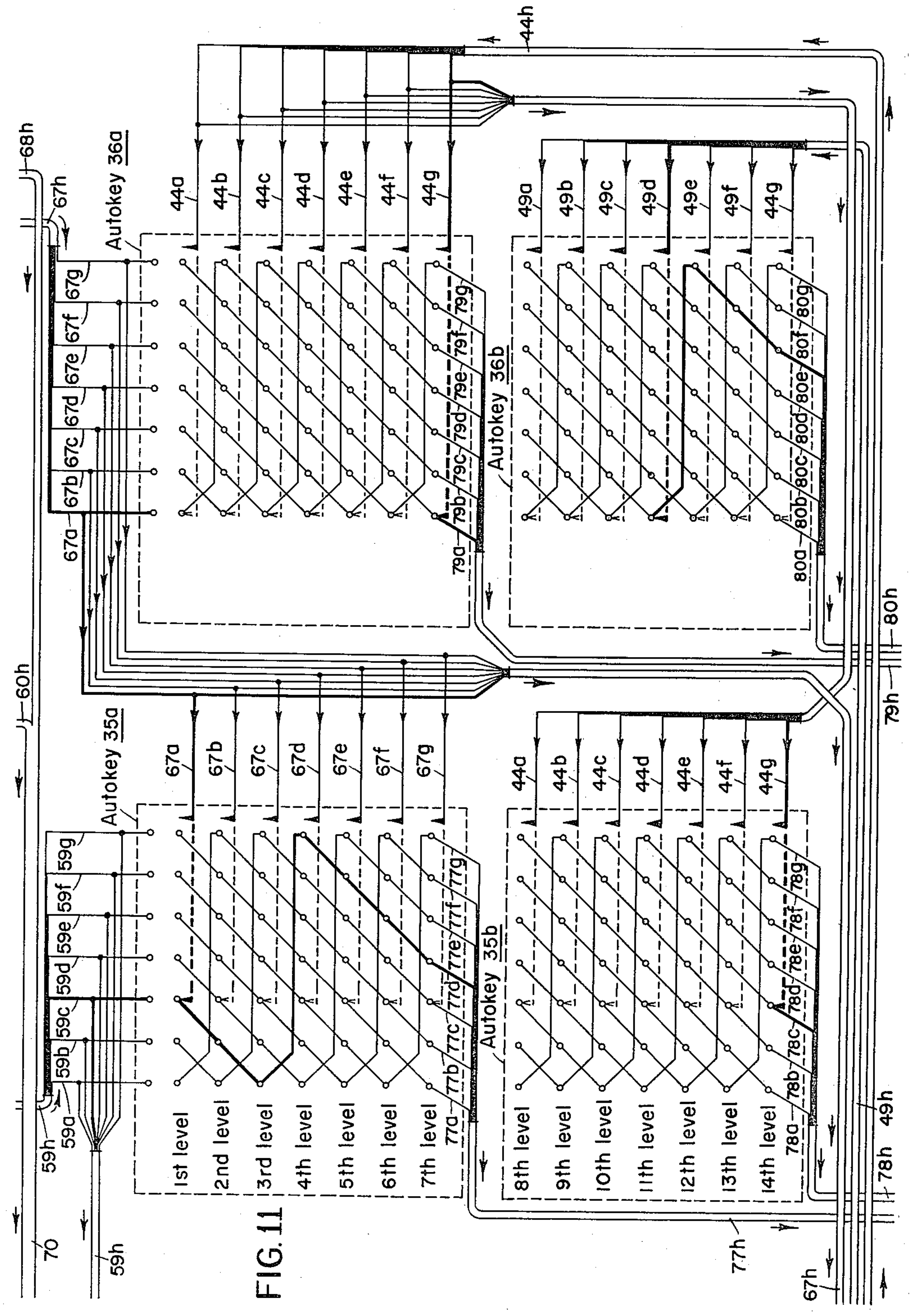
Figure 12:
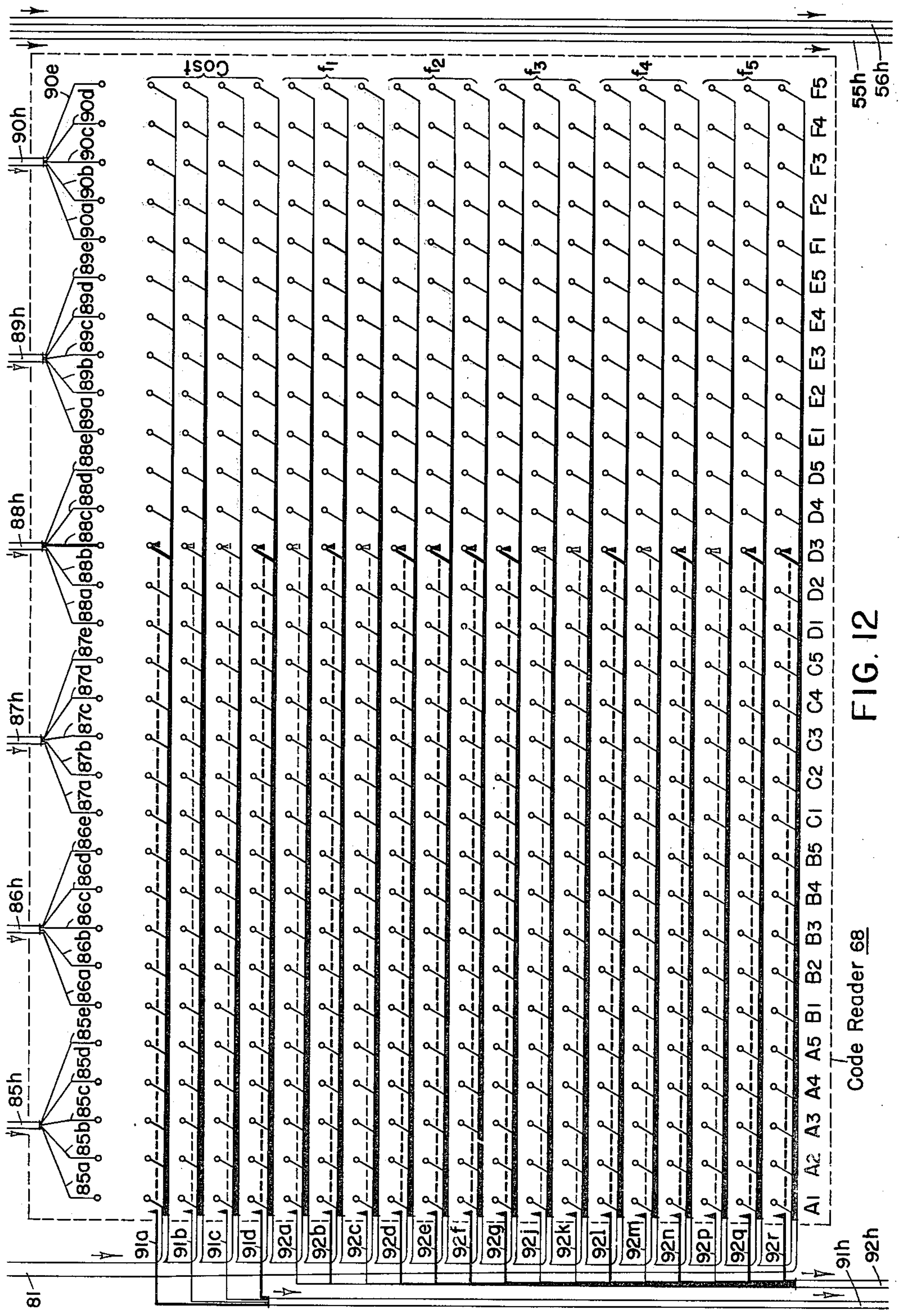
Figure 13:
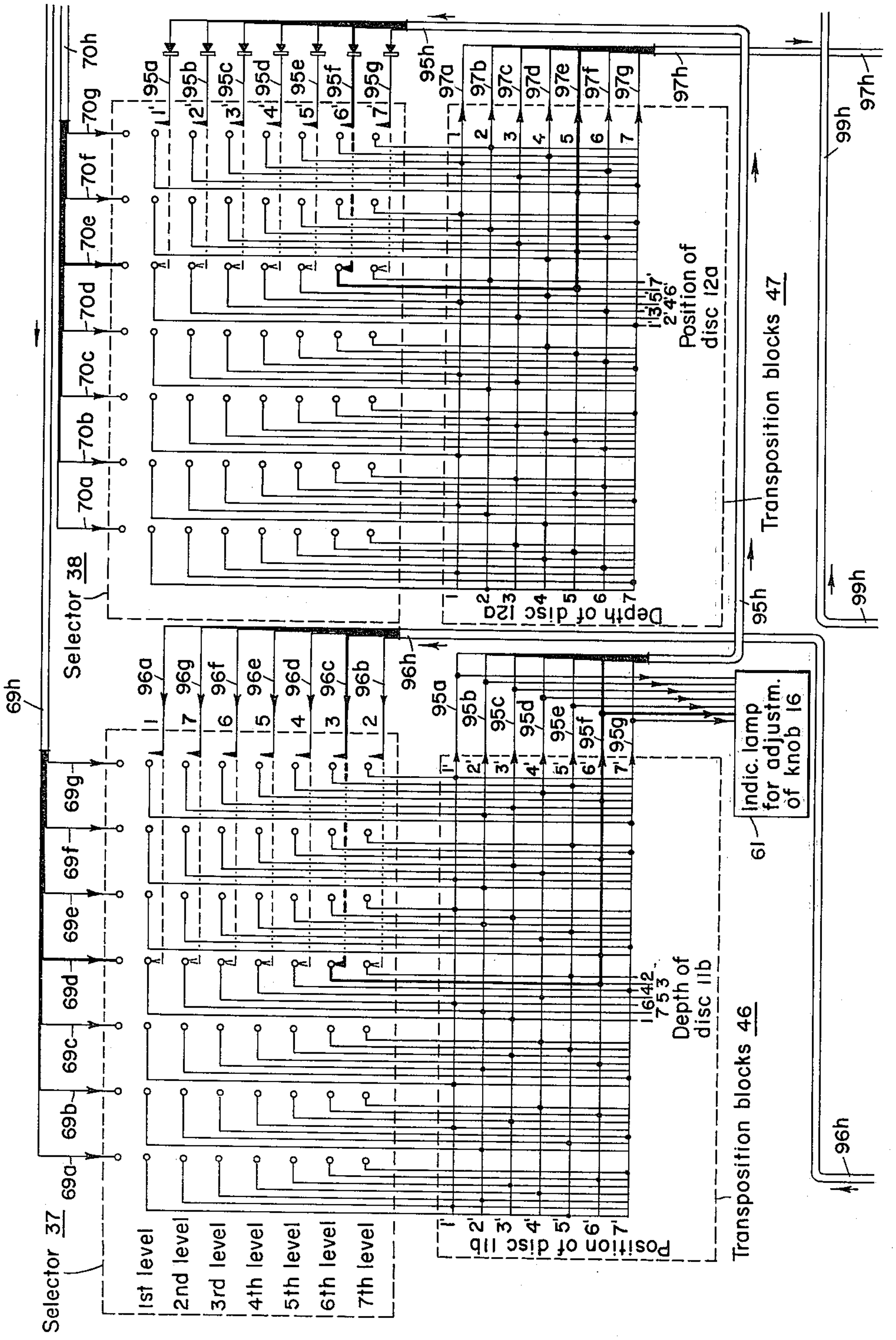
Figure 14:
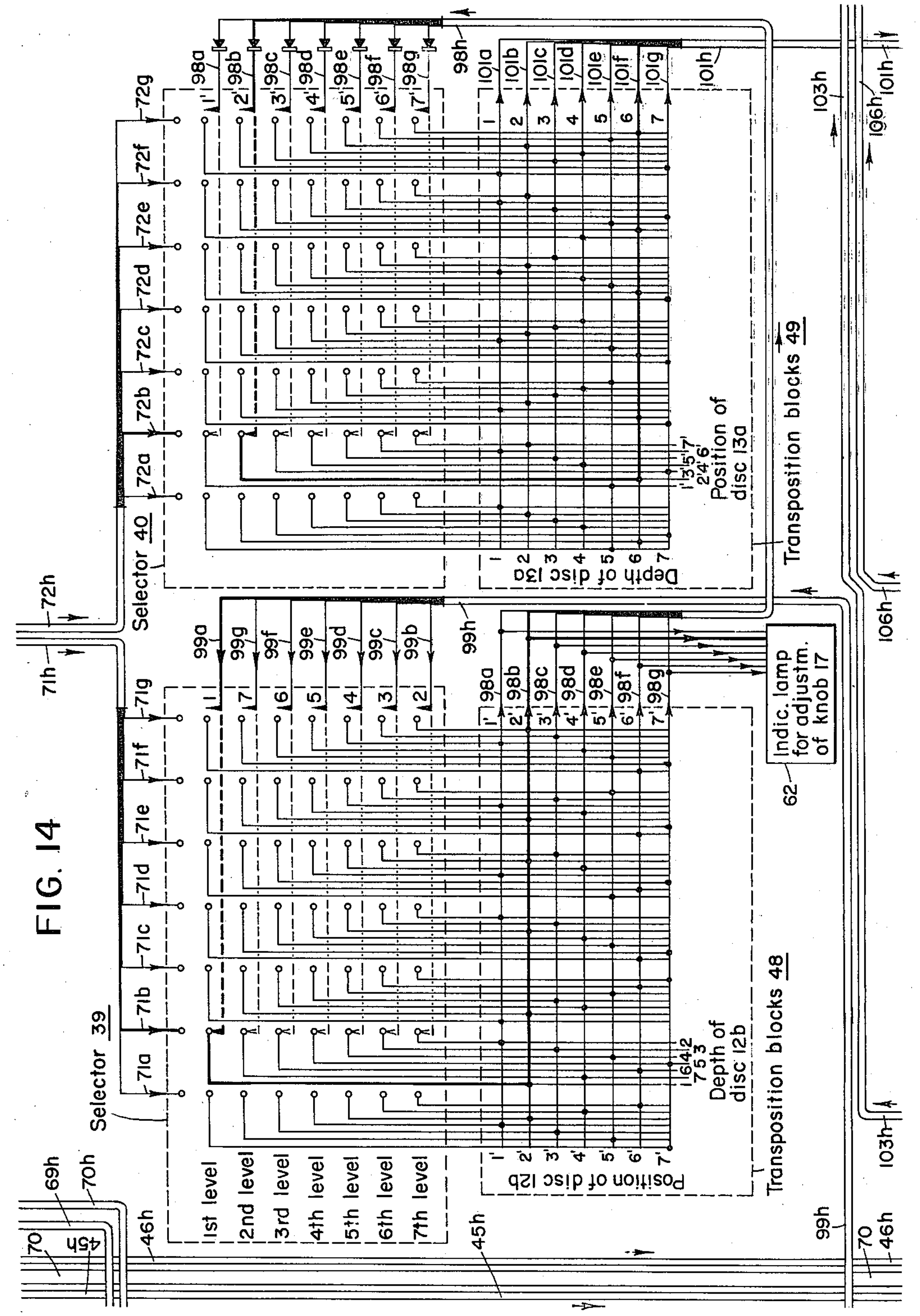
Figure 15:
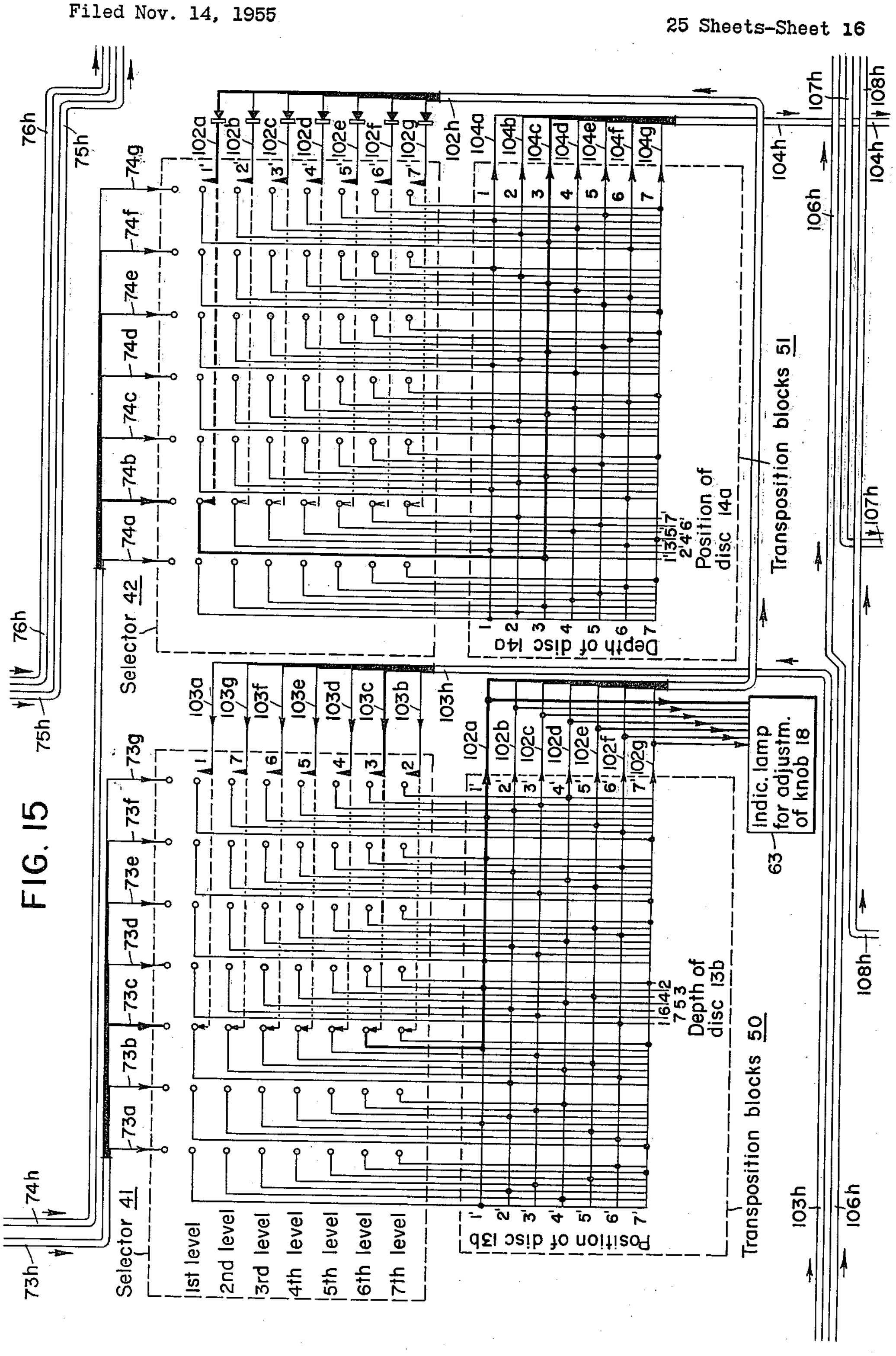
Figure 16:
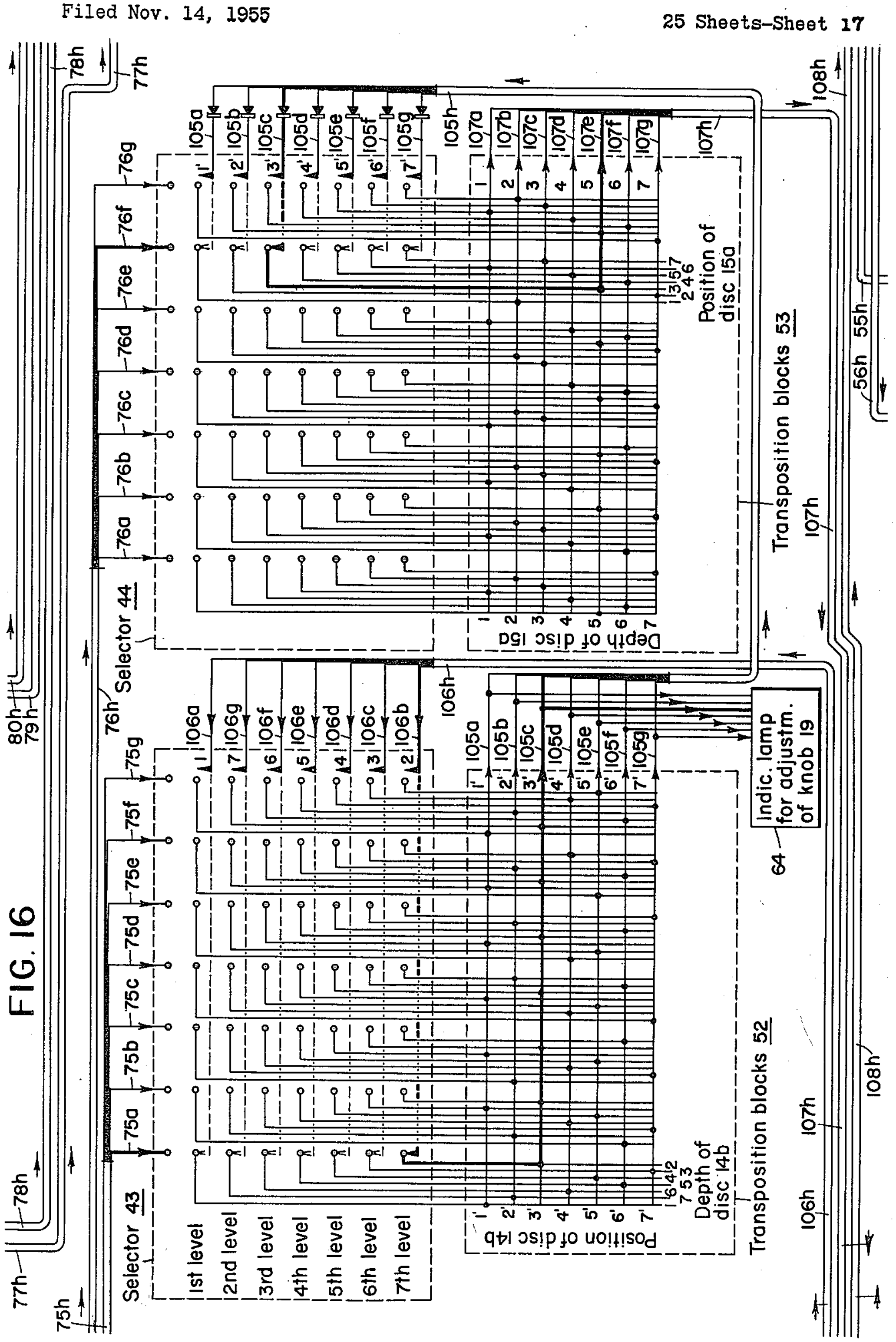
Figure 17:
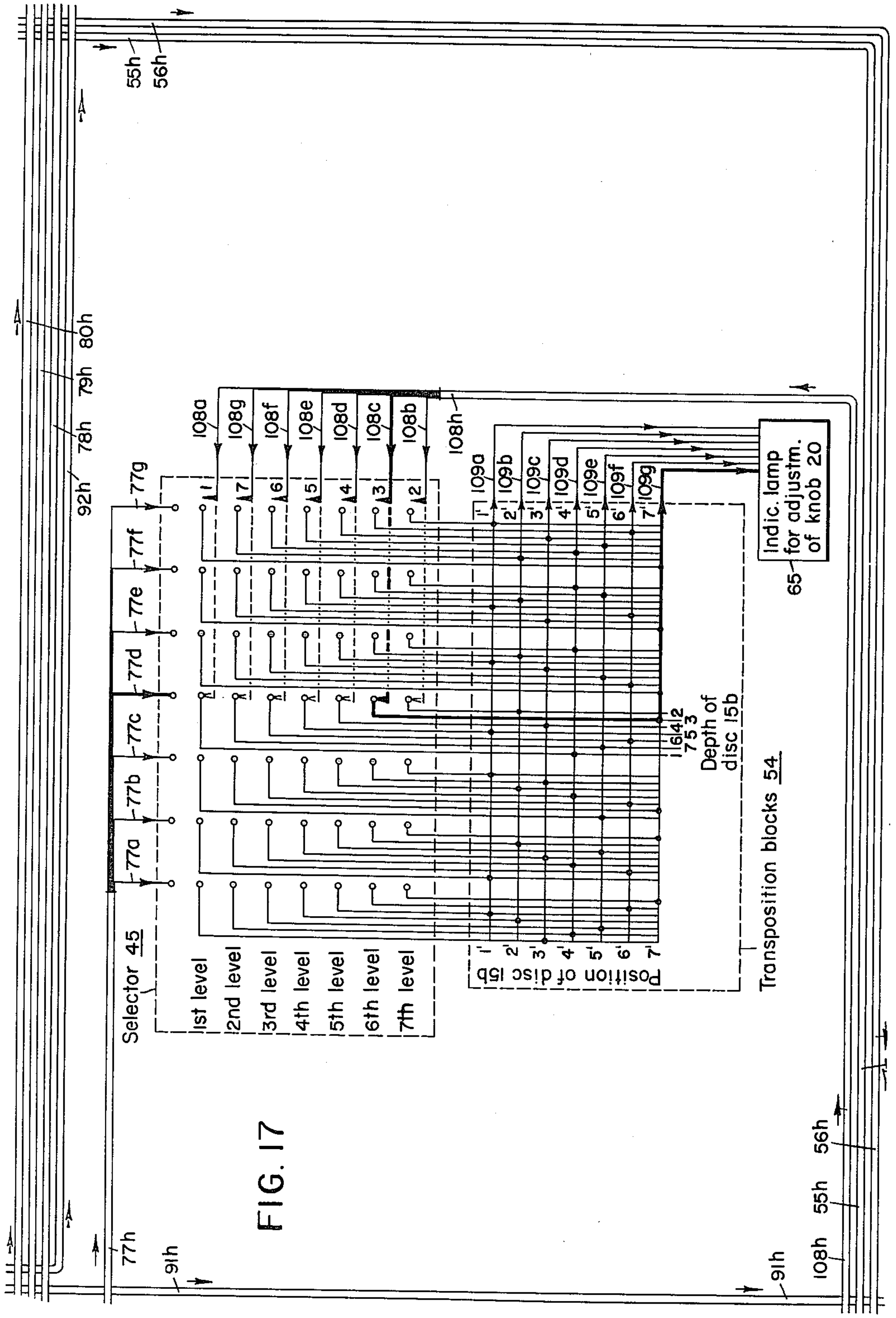
Figure 18:
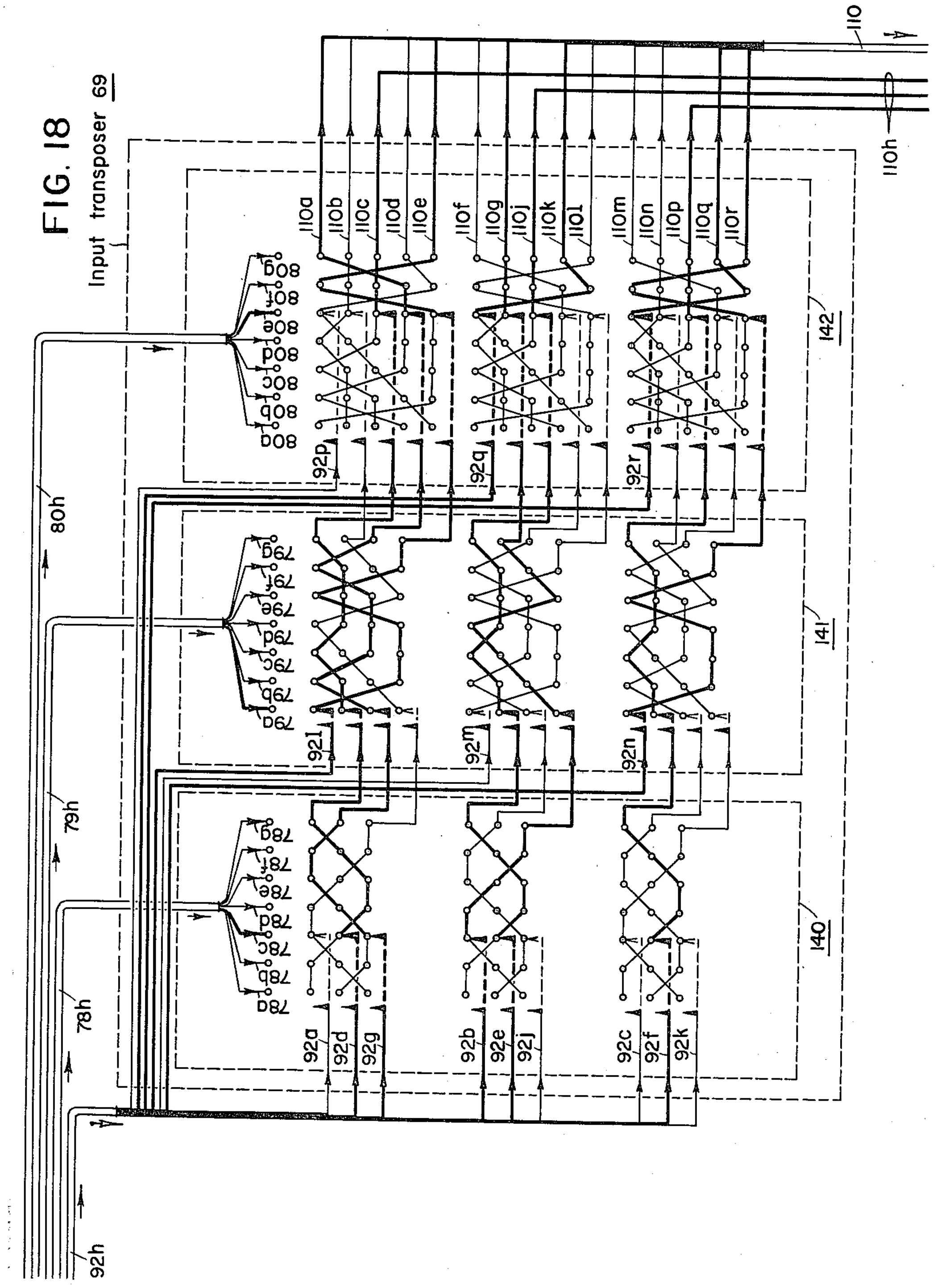

Figures 3–24 collectively constitute a detailed representation of the computer of Figure 2; and Figure 25 illustrates the manner in which the drawings of Figures 3–24 are to be arranged.

Figure 1:
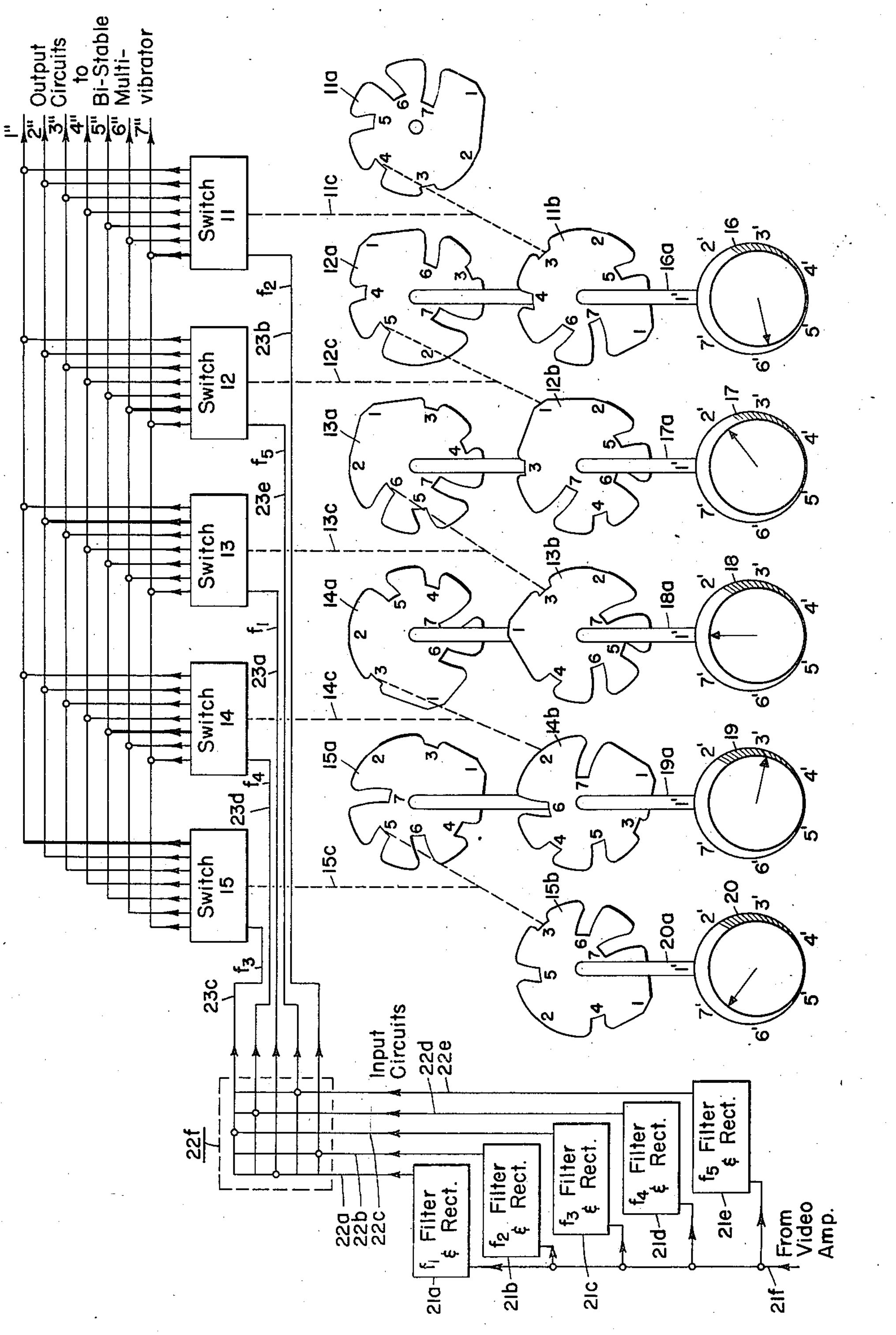
Figure 1 is an explanatory schematic diagram of a switching mechanism which may be employed in the decoder of any one of the receivers of the previously mentioned applications and for which the computer of the invention may determine the necessary setting or adjusting information.

Before considering the structural and operational details of the illustrated computer, it is desirable to discuss the specific switching or decoding mechanism of Figure 1 that is to be adjusted by a subscriber in accordance with information determined by the computer. Such a switching mechanism is shown in complete detail in copending application Serial No. 490,078, filed February 23, 1955, in the name of Morris et al., and assigned to the present assignee.

The switching mechanism is represented in the environment of the subscriber receiver disclosed in the aforementioned application of Bridges, Serial No. 326,107. In that installation, a combination of code signal bursts, individually having a predetermined identifying frequency, is transmitted to subscriber receivers along with the composite video signal during each field-retrace interval. These bursts, which are randomly sequenced and randomly appearing within each combination, are applied over a conductor **21*f* from the video amplifier of the receiver to a series of filter-rectifier units 21*a*–21*e*. Each such unit is highly selective to one of the several tones or frequencies constituting the code signal bursts and, in this manner, the bursts are segregated from one another and rectified for application over a like series of input circuits 22*a*–22*e* to the vertical bars of a transposition block 22*f*. This block is essentially a cross bar arrangement and is provided with a pattern of electrical connections, shown as dots or small circles in the drawing, to variously interconnect input conductors 22*a*–22*e* through a series of horizontal bars to a series of conductors 23*a*–23*e***. Electrical connections between the vertical and horizontal bars may conveniently be achieved by means of conductive rivets. Block 22f effects a transposition at this point in the circuit and adds to the secrecy of the system.

All of the subscribers in the geographical area served by the subscription service are arranged into 120 different groups, which corresponds to the maximum number of different patterns of interconnections that is possible between one given set of five conductors and another set of five conductors. Each subscriber's switching mechanism is provided with a cross bar block 22f having a pattern of interconnections in accordance with the particular group to which each subscriber is assigned.

In the illustrative example of Figure 1, conductor **22*a* connects to conductor 23*a* and then to the input of a movable code-determining device or switch 13; conductor 22*b* connects to conductor 23*b* and to a code-determining device or switch 11; conductor 22*c* to conductor 23*c* and to switch 15, conductor 22*d* to conductor 23*d* and to switch 14, while circuit 22*e* connects to conductor 23*e* and to a code-determining device or switch 12. Switches 11–15, in a manner to be described, selectively establish circuit connections from conductors 23*a*–23*e*, and consequently from input circuits 22*a*–22*e*, to a plurality of output circuits 1″–7″**, which lead to various input terminals of a multi-stable actuating device, such as a bistable multivibrator.

With this arrangement, the code signal bursts are separated from one another on a frequency basis in units **21*a*–21*e* and are applied to the multi-stable actuating device to operate that device as between its several stable operating conditions in a prescribed sequence determined by the adjustment of switches 11–15**. As explained in the Bridges application, the relative timing of the video and synchronizing components of the received subscription television signal is varied with variations in operating conditions of the actuator so that the operating mode of the system is changed in time synchronism but in a complementary sense to corresponding mode changes made at the transmitter to effect decoding.

*Details of switching mechanism*

Code-determining devices or switches 11–15 individually have thirteen operating positions and the switch structure is so arranged that in each such position the switch completes a circuit connection from the single input conductor to a selected one of the seven output conductors 1″–7″. The displacement of the movable component of the switch with respect to its several possible operating positions is under the control of an intersecting mechanism comprising a pair of crossed and pivoted levers functioning in cooperation with a pair of 7-position cams which determine the point of intersection of those levers. This may be readily understood from a consideration of the functional diagram of Figure 1A.

The crossed levers L1 and L2 share a common pivot axis P and each has a cam follower portion F1 and F2 for engagement with an associated indexing cam disc C1 and C2. Each disc has seven sectors, depths or indexing surfaces, numbered 1 to 7, at different radial distances from the axes of cam rotation S1 and S2. Section 1 has the greatest radial dimension while section 7 has the least. The remaining ones 2–6 have a progressively diminishing radial distance and, while shown in an unbroken progression in Figure 1A, they may be arranged in an irregular order to enhance the secrecy of the system.

As the angular positions of cams C1 and C2 are changed, levers L1 and L2 pivot about point P under the influence of biasing springs and to an extent depending upon the radial dimensions of the active cam sectors engaged by followers F1 and F2. For example, with sectors 1—1 engaged by followers F1 and F2 levers L1 and L2 are in their most upright position and their crossover or intersection X is at its greatest distance from pivot P. On the other hand, with cam sectors 7—7 active, the levers are in their least upright position and their intersection X is as close as it can come to pivot P. These two conditions or operating positions define the range of movement of the point of intersection X and the displacement range of the movable element of the switch because that element is maintained at the point of intersection.

Viewed from a different aspect, the described mechanism may be likened to an integrator in which the controlled element, the movable component of the switch, is positioned in accordance with the sum of the radial dimensions of the active sectors of cams C1 and C2. Where the cams are identical and include seven sections having radial dimensions which vary in a progression, the range of displacement is from 2 to 14 times the incremental displacement resulting from changing from one to the next succeeding section of any given cam. This is a range of thirteen incremental steps but it may be converted into an effective 7-step range by the connections indicated in Figure 1B.

The stationary contacts ST1 and ST2 of the switch are connected together conductively and to the input conductor IN. The movable contact is here shown as a bridge-type brush carrier B having brushes at its opposite ends and mechanically connected to the crossed levers L1 and L2 of Figure 1A as indicated at X. The width of the bridge, the dimension of the stationary contacts in a direction transverse to conductors 1″–7″, and the separation of those conductors relative to one another and to the stationary contacts are so selected that brush carrier B is in the position represented when cam sectors 7—7 are engaged by cam followers F1 and F2. For convenience, the output conductor engaged by the upper brush is designated 7″ and for this position of the movable element of the switch input conductor IN connects to output conductor 7″. Should either cam be moved to bring its next sector into the active position, brush carrier B is elevated or displaced one unit and engages the next output conductor which is designated conductor 6″; the next incremental displacement brings the upper brush into contact with output conductor 5″ and so on. When the upper brush, in the step by step displacement of the carriage throughout its range, moves off the top conductor 1″ into engagement with stationary contact ST1, the lower brush leaves stationary contact ST2 and engages conductor 7″. At the extreme end of the range of displacement, when cam sectors 1—1 are both active, the lower brush of carriage B engages conductor 2″.

It is thus apparent that all output conductors, with the single exception of conductor 1″, may be engaged by either the upper brush or the lower brush supported by carriage B whereas conductor 1″ is only contacted by the upper brush. This is termed a "modulo 7" system in which the position of the movable element of the switch may be ascertained as follows. The numbers designating the active sections of both cam discs C1 and C2 are totaled and, where their sum is within the range 2 to 7, inclusive, the position of the movable element of the switch is such that the input conductor is connected to the output conductor which has the same numerical designation. Where their total is in excess of 8, the brush position corresponds to the numerical difference between their total and the numeral 7. Whenever the sum corresponds to 8, the movable switch element connects the input conductor IN to the output conductor 1″.

In other words, it is convenient to refer to the movable switch element as having a range of displacement or positions from 2 to 14, inclusive. They represent the only positions that the movable element may assume and the correlation of those positions to the effective output conductor is shown in the following table:

| Effective output conductor: | Position of movable switch element |
|---|---|
| 1″ | 8 |
| 2″ | 2 and 9 |
| 3″ | 3 and 10 |
| 4″ | 4 and 11 |
| 5″ | 5 and 12 |
| 6″ | 6 and 13 |
| 7″ | 7 and 14 |

Referring now more particularly to Figure 1, each of switches 11 to 15 has a mechanism of the type just described but, in order to simplify the drawing, such mechanism is indicated schematically. The cam discs which control the position of the movable element of each switch bear the same numeral designation as the switch itself but with subscripts *a* and *b* while the crossed levers comprising the intersecting mechanisms are represented symbolically by broken construction lines, again having the same numeral designation as the switch but with a subscript *c*.

In order to facilitate selective adjustment of the several switches, the multi-section cam discs are supported on shafts. Shaft **16*a* supports discs 11*b* and 12*a*; shaft 17*a* supports discs 12*b* and 13*a*; shaft 18*a* supports discs 13*b* and 14*a*; shaft 19*a* supports discs 14*b* and 15*a* while shaft 20*a* carries a single disc 15*b*. Each such shaft terminates in a control knob identified by a corresponding reference numeral, movable in a clockwise direction to rotate the shaft and each disc secured thereto, and having seven positions of adjustment designated 1′–7′. Disc 11*a*** is mounted on a stub shaft and is not available for movement by the subscriber. It is set at the time of installation and may be adjusted by a serviceman from time to time in order to maintain and enhance the secrecy of the system.

The described arrangement has the distinct advantage that a particular pattern of circuit connections from the filter-rectifier units **21*a*–21*e* to the output conductors 1″ to 7″ may be effected by a variety of settings of the control knobs 17–20**. This permits individualizing the information required for each subscriber to arrive at a particular pattern of circuit connections. By way of example, for the illustrative position of the control knobs shown in Figure 1 the connections made through the switches to the several output conductors, under the control of the cross levers and cam pairs, are shown in the following chart:

| Switch | Control Knob Positions | Active Cam Sections | Switch Position | Effective Output |
|---|---|---|---|---|
| 11 | 16—#6′ | 11*a*—#4, 11*b*—#3 | 7 | 7″ |
| 12 | 16—#6′, 17—#2′ | 12*a*—#5, 12*b*—#1 | 6 | 6″ |
| 13 | 17—#2′, 18—#1′ | 13*a*—#6, 13*b*—#3 | 9 | 2″ |
| 14 | 18—#1′, 19—#3′ | 14*a*—#3, 14*b*—#2 | 5 | 5″ |
| 15 | 19—#3′, 20—#7′ | 15*a*—#5, 15*b*—#3 | 8 | 1″ |

The manner in which the positions of control knobs 16–20 is determined in order to establish a particular pattern of interconnections from the filter-rectifier units **21*a*–21*e*** to the output conductors 1″–7″ will be demonstrated hereinafter in describing a typical operation of the computer.

*General discussion of computer*

In discussing the computer, a general description will initially be given with particular reference to the block diagram of Figure 2. A key board 24 is provided to register each one of $7^6$ or 117,649 different six-digit identification numbers each of which is assigned to the switching mechanism for a different subscriber. A program selection is also registered in the key board. The registered identification number indirectly represents the particular cam discs or distinguishing characteristics in a given subscriber's mechanism and also indirectly represents the transposition pattern of that subscriber's block 22f. Such information is supplied to a series of substitution switches 25–30 which effectively convert the identification number to a representation in the form of a six-digit substituted number that bears no readily ascertainable relationship to the original registered identification number. The substituted number is then conveyed to a series of autokeys 31a–36a and 31b–36b which respond thereto to produce twelve "bits" of information representing the characteristics or peculiarities of the switching mechanism of the decoder corresponding to the registered identification number. Essentially, each autokey is actuated in response to two of the digits of the substituted six-digit number effectively to add those digits and produce one "bit" of information. With this arrangement, the individual digits of the substituted number are combined for addition in twelve different ways to produce representations of twelve different characteristics of the switching mechanism of the decoder assigned to the registered identification number.

Nine of the autokeys (specifically, 31a–35a and 31b–34b) are individually coupled to assigned ones of memory selectors 37–45 to effect actuation thereof and select one memory unit in each of transposition blocks 46–54. The nine selected memory units individually represent the particular configuration of an assigned one of the nine indexing cam discs 12*a*–15*a* and 11*b*–15*b* (Figure 1) of the switching mechanism of the registered subscriber. The positioning of fixed disc 11*a* is represented by the positioning of substitution switch 25 which is conveyed to a transposition block 55. The computer has now been actuated to establish circuitry representing the particular indexing cam discs employed in the switching mechanism of the decoder assigned to the registered identification number.

Meanwhile, a program selection has also been registered by operating keys on key board 24. Each program preferably requires a different pattern of interconnections between the subscriber's input circuits 22*a*–22*e* and output circuits 1''–7''. Information pertaining to the exact circuit interconnection pattern required for each one of a series of programs (for example, thirty different programs) is stored in a master code patch board 66. When a program selection is made, a selector 67 selects the stored information for that program by means of a code reader 68. The code reader thus provides an indication of the coupling pattern that must be effected between the input and output circuits of the subscriber's switching mechanism in order to route the rectified frequency bursts $f_1$–$f_5$ to output circuits 1''–7'' in accordance with the pattern dictated by the stored information for the particular program selected.

The particular transposition arrangement of the block 22f in the subscriber's decoding mechanism also must be ascertained by the computer and to this end the output of the autokeys 36a, 35b and 36b represent which one of the 120 different possible transpositions is present in the registered mechanism. An input transposer 69 is operated in response to the output of those three autokeys to duplicate, so to speak, the transposing pattern of block 22f. The frequency destinations of routings represented by the output of code reader 68 are channeled through transposer 69 to develop an indication in its output as to the connections of the inputs 22*a*–22*e* to the switches 11–15.

It is contemplated that some of the subscribers in a given geographical area will desire to pay for the subscription programs as viewed, rather than operate on a charge basis. For such subscribers, another transposer is inserted in cascade with block 22f so that each time a coin, such as a quarter, is deposited a different transposition is established. The transposition that must be established in the coin-actuated apparatus at these cost or cash subscribers (as distinguished from the charge subscribers) for the particular program selected is represented by information supplied from patch board 66 and code reader 68 through a binary-to-decimal converter 77 to a cost transposer 76. The connections that must be established through such a transposition arrangement is set up in cost transposer 76 in response to such information and thus the output of input transposer 69 is partially translated through transposer 76. In order for a cost subscriber to view a program, a predetermined number of coins adding up to the cost of the program must be deposited to achieve a complementary transposition pattern effectively to cancel that introduced by transposer 76. For most subscribers no cost transposition mechanism will be employed and thus transposer 76 will indicate no additional transposition in addition to block 22f.

The output of cost transposer 76 and part of that of input transposer 69 is supplied to a series of binary-to-decimal converters 71–75 which provide at their outputs an indication of the frequency of the rectified bursts which are supplied to each of the various switches 11–15 for the subscriber in question and also an indication of the output circuit to which those rectified bursts must be supplied in order to successfully decode the selected program.

The code building process now takes place in the computer. In view of the fact that the adjustment of each one of the control knobs, with the exception of knob 20, changes the position of two of the switches, the required knob settings to establish the desired circuitry must be determined in sequence going from right to left in Figure 1. A memory unit in transposition block 55 has been selected which represents the active depth of sector of fixed disc 11*a* that partially controls switch 11. This memory unit effects actuation of an adder 56 to register that depth. Information pertaining to the operating position which switch 11 must assume is applied to the adder from one of the converters 71–75 and the adder in effect selects the depth of sector of cam disc 11*b* which when effectively added to the active depth of sector of disc 11*a* properly positions switch 11 to the desired output circuit. Information relating to the required active depth of disc 11*b* is supplied through memory selector 37 to the selected memory unit in transposition blocks 46 in order to determine the position of knob 16 which places the necessary depth or sector into engagement with intersecting mechanism 11*c*. The required setting of knob 16 is indicated on an indicator lamp 61 to inform the computer operator and ultimately the subscriber.

Information regarding the position of knob 16 and consequently cam disc 12*a* is supplied from the selected memory unit in transposition blocks 46 to selector 38 and to the selected memory unit in transposition blocks 47 to indicate the active depth or sector of disc 12*a* when knob 16 is placed in the position required. This indication is employed to effect actuation of an adder 57 to register this active depth of disc 12*a* which will be employed in controlling the position of switch 12. Information relating to the position to which switch 12 must assume is translated to adder 57 from one of converters 71–75 and the adder effectively selects the depth or sector required on the part of disc 12*b* in order to actuate switch 12 to that desired position. Information regarding the desired depth is applied through selector 39 to the selected memory unit in transposition blocks 48 wherein the position of knob 17 is determined that will place that depth in the proper position. This required setting is relayed to indicator lamp 62 to inform the operator and the subscriber as to the knob setting required for knob 17. Likewise, indicator lamps 63–65 are operated in similar manner to indicate the positioning of knobs 18—20 respectively.

A tape perforator 82 is provided to register a proper record of each registered identification number, the program selected, and the cost of that program.

*Detailed consideration of computer*

The detailed construction of the computer as illustrated in Figures 3–24 will now be considered. It will be remembered that these figures must be arranged as shown in Figure 25 in order to constitute one integral circuit. Key board 24 shown in Figure 3 comprises a family of fifty-three conventional punch keys, each controlling a normally open single pole single throw switch. The movable blades of all of the switches are connected in common and to a source of positive undirectional potential 24*a*. Each time a key is punched the movable switch blade of the associated switch causes the application of a positive potential to the corresponding fixed contact. There are eight vertical columns of punch-controlled on-off switches, the six vertical columns on the left under the designation "Subscriber's Identification Number", each comprising seven switches. The two columns on the right under the heading "Program" have six and five switches respectively. The punch-actuated switches for registering the subscriber's identification number are arranged in seven rows and each row represents a number from one to seven. As mentioned previously, each subscriber's identification number will include six digits each of which may be any number in the range from one to seven. The seven rows have thus been numbered 1–7 on the drawing. Consequently, in registering any given subscriber's identification number, the operator punches one of the seven keys in the extreme left column corresponding to the 1st digit, punches a key in the second column corresponding to the 2nd digit, and so forth. It will be noted that a selected punch-actuated switch in each column is established (in dashed construction) in its "on" condition. They will be discussed later in connection with an illustrative example considered in explaining the detailed operation of the entire computer, and thus neglect for the moment the switches that are closed.

It will also be noted in observing Figures 3–24 that certain conductors and switch contacts are drawn in heavier lines, either solid or dashed, than others. Likewise, disregard these heavier lines during the structural description since they will be discussed hereinafter when tracing the active circuits in the illustrative example presented in the operational discussion.

The six switches in the first column under "Program" are individually designated A–F respectively and the five switches in the second column are indicated 1–5. The computer as illustrated is capable of selecting the knob settings for each subscriber for any one of thirty different programs. In order to make the program selection, one of the punch-actuated contacts A–F and one of the contacts 1–5 are operated.

*Substitution switches 25–30*

The fixed contacts of the switches devoted to the registration of the subscriber's identification number are connected to the substitution switches 25–30. Specifically, the fixed contacts of the switches in the first column for registering a 1st identification digit are connected over conductors 48*a*–48*g* through a cable 48*h* to the row of seven fixed control contacts for substitution switch 26. The fixed contacts in the second column for registering the 2nd digit are connected over conductors 53*a*–53*g* through a cable 53*h* to the seven fixed control contacts of substitution switch 29. The fixed contacts in the third column for registering the 3rd digit are connected over conductors 51*a*–51*g* through a cable 51*h* to the fixed control contacts of substitution switch 27. The fixed contacts in the fourth column for registering the 4th digit are connected over conductors 41*a*–41*g* through a cable 41*h* to the seven fixed control contacts of substitution switch 25. The fixed contacts in the fifth column for registering the 5th digit are connected over conductors 54*a*–54*g* and through a cable 54*h* to the fixed control contacts of substitution switch 30. Finally, the fixed contacts of the sixth column for registering the 6th digit are connected over conductors 52*a*–52*g* and through a cable 52*h* to the fixed control contacts of substitution switch 28. The circuits to which the program selection switches in key board 24 are connected will be discussed later.

Each of substitution switches 25–30 consists of a conventional seven-point, rotary stepping switch which, in response to a positive potential on one of its seven fixed control contacts, steps a movable wiper assembly over to that contact and retains it there until the switch is "homed." Each substitution switch also has a multiplicity of levels of fixed contacts (seven contacts per level) and the wiper assembly includes a corresponding multiplicity of wiper contacts operated in unison so that a wiper contact establishes an electrical connection to a selected fixed contact in each level, which selected contact is determined by the fixed control contact upon which a positive potential is found. The seven fixed contacts of the 1st level of switch 25 are connected over conductors 43*a*–43*g* forming a cable 43*h* to the wiper contacts for the 2nd to the 8th levels of substitution switch 26. The fixed contacts in the 1st level of switch 26 are connected over conductors 42*a*–42*g* which form a cable 42*h* to the wiper contacts for the 2nd to the 8th levels of substitution switch 25. Wiper contact 25*a* for the 1st level of switch 25 and wiper 26*a* for the 1st level of switch 26 are connected respectively to sources 25*b* and 26*b* of positive potential.

The forty nine fixed contacts in the 2nd to the 8th levels of switch 25 are connected in seven groups of seven contacts each in a random manner and each of the seven groups is connected to an assigned one of conductors 44*a*–44*g* which, in turn, are connected through a cable 44*h* to the fixed control contacts of autokey 31a. Similarly, the forty nine fixed contacts in the 2nd to the 8th levels of switch 26 are connected together in groups of seven contacts each in accordance with a random pattern and conductors 49*a*–49*g* connect each one of the seven groups through a cable 49*h* to the fixed control contacts of autokey 32a.

With this arrangement, the registration, through the manipulation of key board 24, of the first and fourth digits of the subscriber's identification number energizes selected control contacts of substitution switches 25 and 26. Accordingly, when the switch wipers scan the banks of contacts their movement is interrupted and the wipers stop at the vertical column determined by the energized fixed contacts, as indicated by the dashed extensions of the wipers in Figure 5 the significance of which will be explained hereinafter.

After switches 25 and 26 have thus assumed selected positions, the potential applied to wiper 25*a* from source 25*b* is translated over the one of conductors 43*a*–43*g* which connects to the contact engaged by the wiper, through cable 43*h*, to the associated one of the wipers of switch 26 and thence over the one of conductors 49*a*–49*g* contacted by that wiper to the assigned contact of autokey 32a. This establishes a control voltage on autokey 32a. In similar fashion, the potential applied to wiper 26*a* from source 26*b* is impressed on the one of conductors 42*a*–42*g* which connects to the contact engaged by the wiper, then over cable 42*h* to the associated wiper of switch 25, and over the assigned one of conductors 44*a*–44*g* to a selected fixed control contact of autokey 31a. Because of the random nature of the connections between the fixed contacts of switches 25 and 26, the registration of the 1st and 4th digits results in a representation on autokeys 31a and 32a that has no readily ascertainable relationship to the specific numbers registered.

Figure 19:
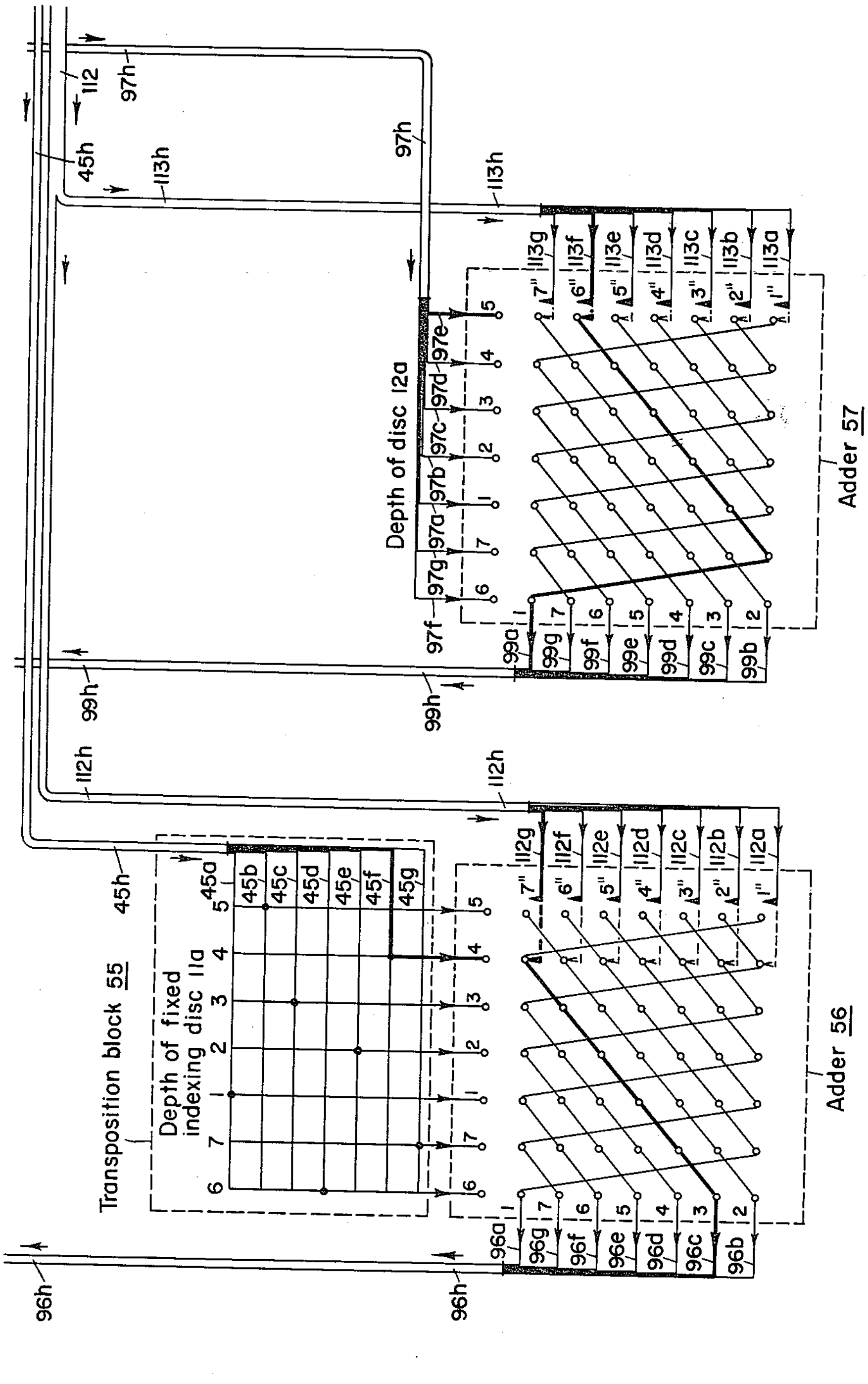
Figure 20:
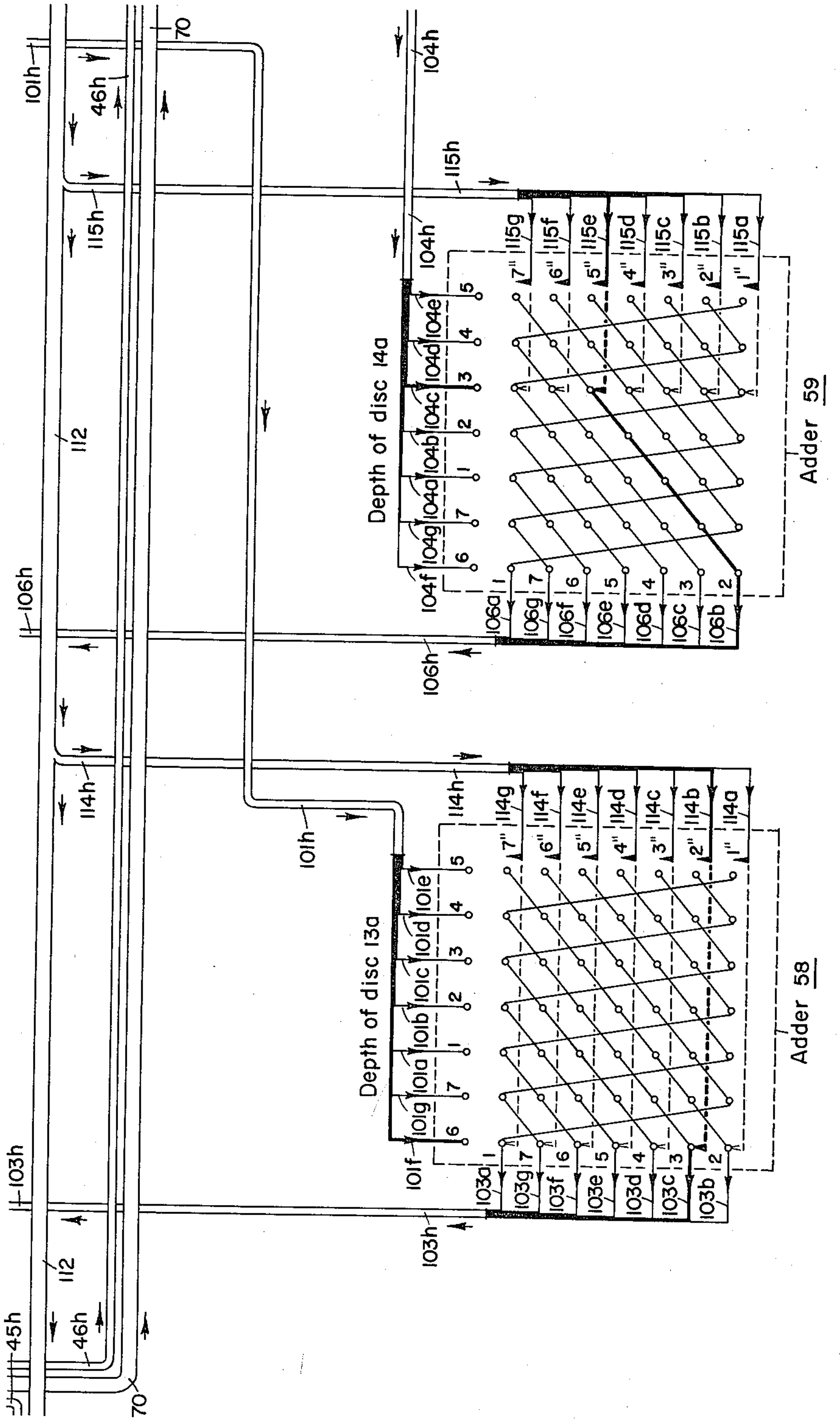
Figure 21:
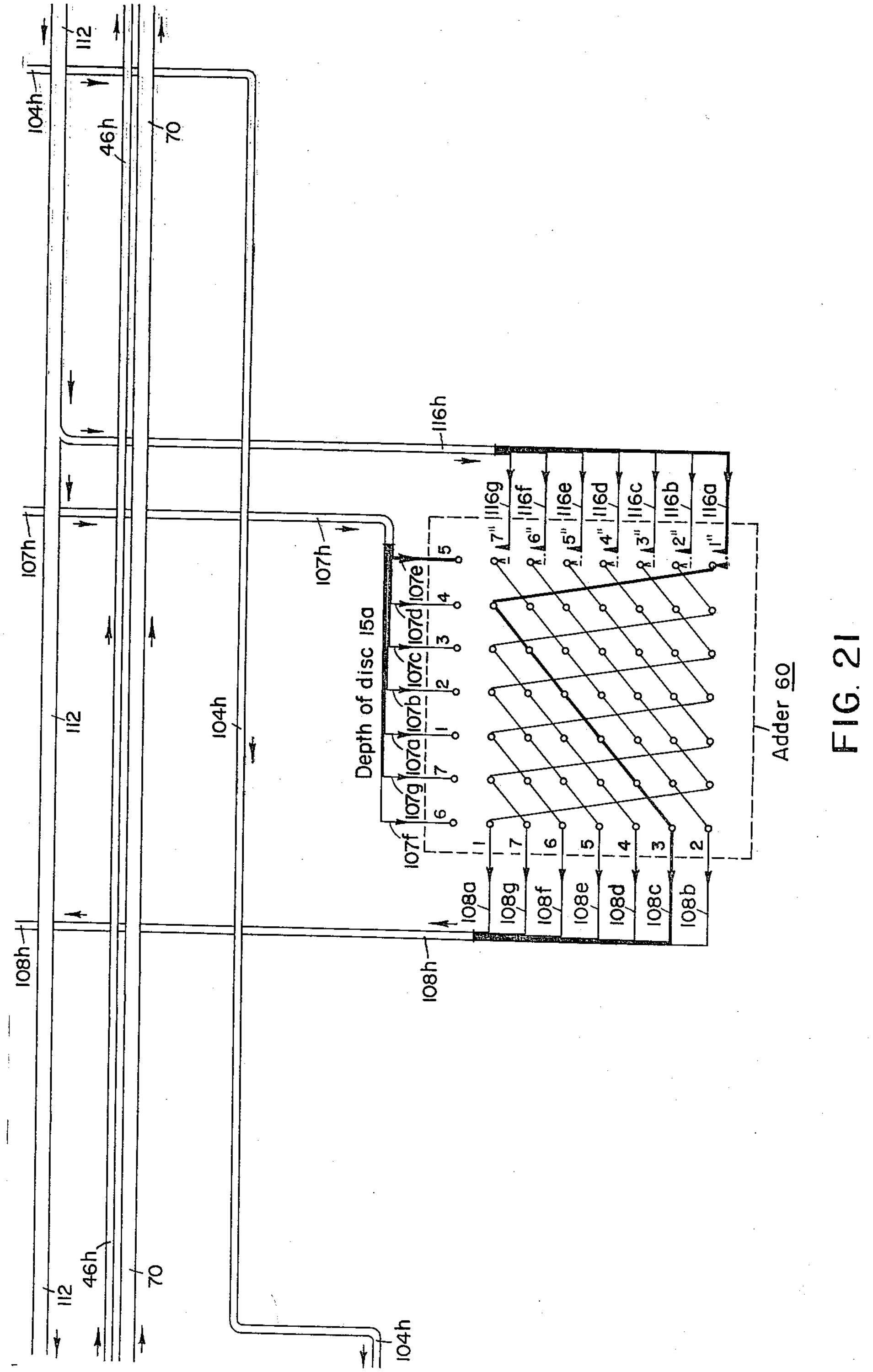

The fixed contacts in the 9th level of switch 25 are connected over conductors 45*a*–45*g* and through a cable 45*h* to the horizontal bars of transposition block 55 in Figure 19. Wiper 25*c* in the 9th level is connected to a source of positive potential 25*d* and after switch 25 has assumed a selected operating condition, a positive potential from source 25*d* is impressed on one of the fixed conacts of the 9th level and then applied to a selected hroizontal bar of block 55 for reasons which will be explained hereinafter.

Figure 23:
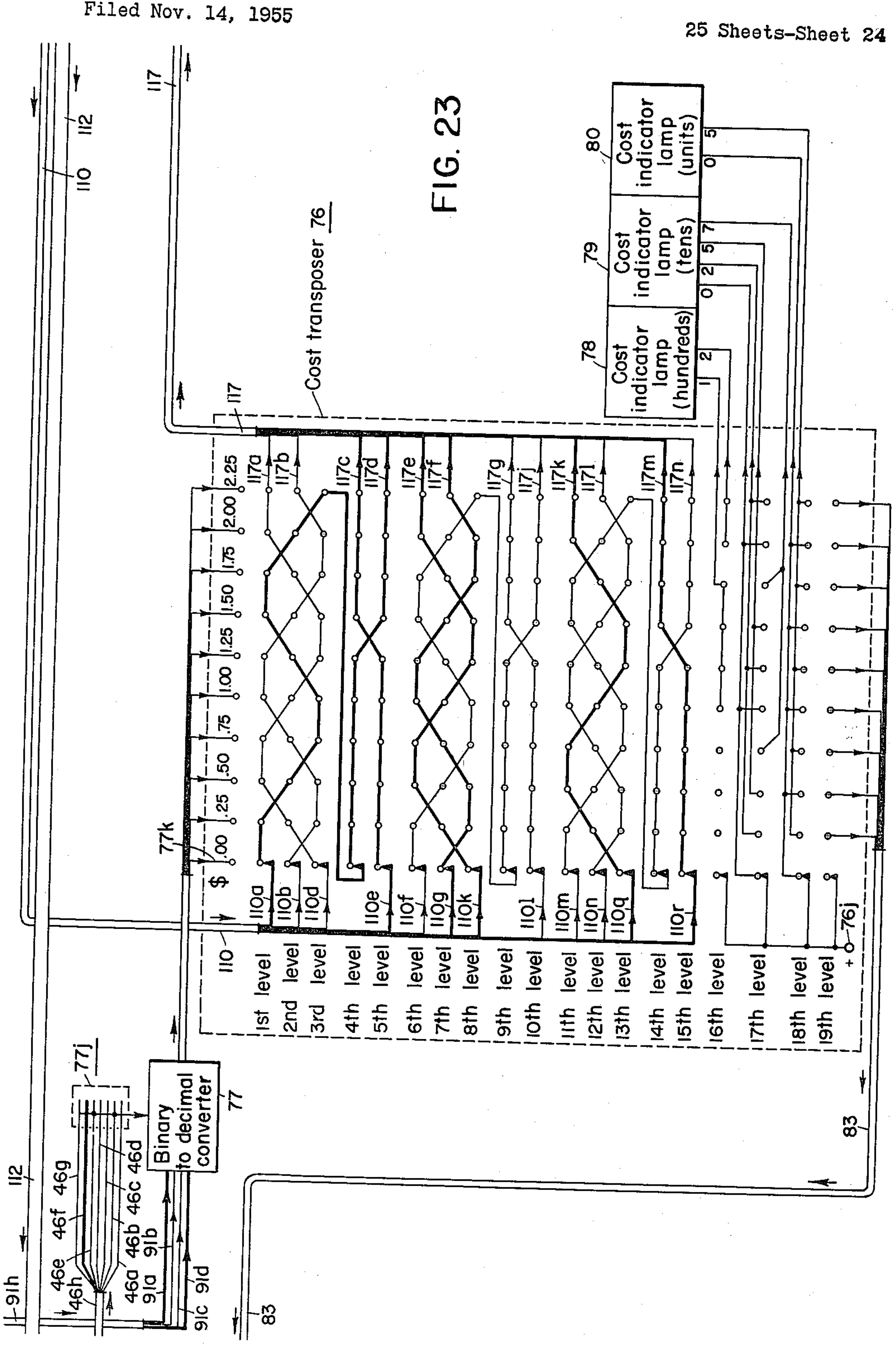

The fixed contacts in the 10th level of switch 25 are connected over conductors 46*a*–46*g* and through a cable 46*h* to the horizontal bars of a patch board 77j which is in the input circuit of binary-to-decimal converter 77 (Figure 23). Wiper 25*e* of the 10th level of switch 25 is connected to a source of positive potential 25*f*, and after it has been stepped over to a selected operating condition a voltage from source 25*f* is applied over one of conductors 46*a*–46*g* to a selected horizontal bar of patch board 77j, also for reasons which will be discussed later.

Figure 22:
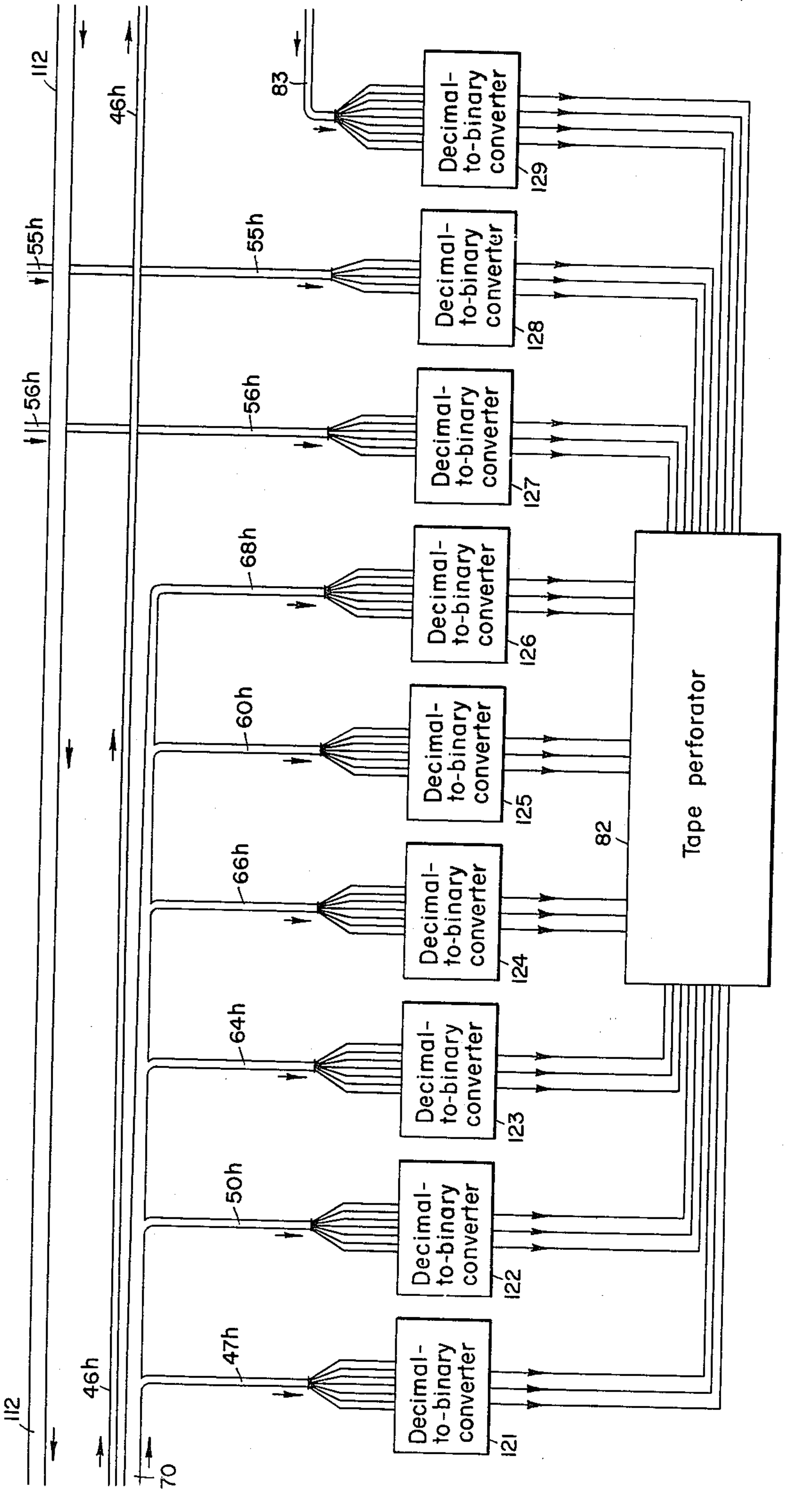

The contacts in the 11th level of switch 25 are connected over conductors 47*a*–47*g* and through a cable 74*h* to a larger cable 70 which, in turn, is connected to a decimal-to-binary converter 121 (Figure 22). Wiper 25*g* of the 11th level is connected to a source of positive potential 25*j* and impresses that potential on the selected one of the fixed contacts of the 11th level engaged by the wiper and thence to one of conductors 47*a*–47*g*.

The fixed contacts in the 9th level of substitution switch 26 are connected over conductors 50*a*–50*g* and through a cable 50*h*, then larger cable 70, to a decimal-to-binary converter 122 (Figure 22). Wiper 26*c* for this switch level is connected to a source of positive potential 26*d* and applies this potential to one of the fixed contacts when switch 26 has assumed one of its operating conditions, thereby to apply a control voltage over the associated one of conductors 50*a*–50*g*.

Substtiution switches 27 and 28 are connected in much the same manner as switches 25 and 26 but they respond to the registration of other digits of the subscriber's identification number; more specifically, the 3rd digit controls the positioning of switch 27 and the 6th digit controls the positioning of switch 28. The fixed contacts in the 1st level of switch 27 are connected over conductors 62*a*–62*g* which comprises a cable 62*h* to the wiper contacts for the 2nd through the 8th levels of switch 28. The fixed contacts in the 1st level of switch 28 are connectedf over conductors 61*a*–61*g* which comprise a cable 61*h* to the wiper contacts of the 2nd through the 8th levesl of switch 27. Wiper 27*a* of the 1st level of switch 27 is connected to a source of positive potential 27*b*. Similarly, wiper 28*a* of the 1st level of switch 28 is connected to a source of positive potential 28*b*. The forty nine fixed contacts in the 2nd through the 8th levels of switch 27 are connected in seven groups of seven contacts each, in a random fashion, with each group being connected to one of conductors 63*a*–63*g* and through a cable 63*h* to the fixed control contacts of autokey 33a. The forty-nine fixed contacts in the 2nd through the 8th levels of switch 28 are likewise connected together into seven groups with seven contacts in each group. Each one of the seven groups is connecetd to an assigned one of conductors 65*a*–65*g* and through a cable 65*h* to the fixed control contacts of autokey 34a.

In response to the registration of the 3rd and 6th digits of the subscriber's identification number, a potential is placed on a selected one of conductors 51*a*–51*g* and also on a selected one of conductors 52*a*–52*g*. Consequently when the wipers of switches 27 and 28 step across to the selected contact positions, a positive potential from source 27*b* is applied over wiper 27*a* through one of conductors 62*a*–62*g* to an associated wiper in switch 28 and thence over one of conductors 65*a*–65*g* to a fixed control contact of autokey 34a. Similarly, a positive voltage from source 28*b* is applied over wiper 28*a* and a selected one of conductors 61*a*–61*g* to a wiper of switch 27 and thence over a selected one of conductors 63*a*–63*g* to one of the fixed control contacts of autokey 33a.

The fixed contacts in the 9th level of switch 27 are connected over conductors 64*a*–64*g* to a cable 64*h* which in turn is connected through the larger cable 70 to a decimal-to-binary converter 123. Wiper 27*c* in the 9th level of switch 27 is connected to a source of positive potential 27*d* and applies that potential to one of conductors 64*a*–64*g* after the wiper of the substitution switch has been stepped to one of its operating positions. In similar manner, the fixed contacts in the 9th level of switch 28 are connected over conductors 66*a*–66*g* to a cable 66*h* and over the larger cable 70 to a decimal-to-binary converter 124. Wiper 28*c* in the 9th level is connected to a source of positive potential 28*d* and after switch 28 has assumed a selected operating position, the potential from source 28*d* is applied over a selected one of conductors 66*a*–66*g* to converter 124.

Switches 29 and 30 are also wired in a similar fashion as the substitution switches previously discussed but, in this case, the positioning of switch 29 is controlled by the 2nd digit in the subscrier's identification numer and the position to which switch 30 is actuated is determined by the 5th digit thereof. The fixed contacts of the 1st level of switch 29 are connected over conductors 58*a*–58*g* which form a cable 58*h* to the wipers of the 2nd through 8th levels of switch 30. The fixed contacts of the 1st level of switch30 are connected over conductors 57*a*–57*g* which make up a cable 57*h* to the wiper contacts of the 2nd through the 8th levels of switch 29 Wiper 29*a* in the 1st level of switch 29 is connected to a source of positive potential 29*b*. Wiper 30*a* in the 1st level of switch 30 is connected to a source of positive potential 30*b*.

The forty nine fixed contacts from the 2nd through the 8th levels of switch 29 are connected together in random to make up seven groups of seven contacts each, conductors 59a–59g being connected to respective ones of the groups to convey information over a cable 59h to the fixed control contacts of autokey 35a. The forty nine fixed contacts in the 2nd through the 8th levels of switch 30 are also connected into groups of seven contacts each, in a random pattern, with each one of the groups connected to one of conductors 67a–67g and then over a cable 67h to the fixed control contacts of autokey 36a. After a potential has been placed on a selected one of the fixed control contacts of switch 29 from the key board in response to the registration of the second digit of the subscriber's number, the wipers of switch 29 are stepped over to the selected position corresponding to the control contact upon which the potential is found. Likewise, after a potential has been placed on one of the fixed control contacts of switch 30, in response to the registration of the 5th digit of the subscriber's number, substitution switch 30 is actuated to that operating position corresponding to the control contact upon which the potential is placed. A positive potential from source 29b is thus applied over wiper 29a and a selected one of conductors 58a–58g to one of the wipers of switch 30 and then over one of conductors 67a–67g to one of the fixed control contacts of autokey 36a. A positive potential from source 30b is similarly translated over wiper 30a and a selected one of conductors 57a–57g to one of the wipers of switch 29 and then over a selected one of conductors 59a–59g to a fixed control contact of autokey 35a.

The fixed contacts in the 9th level of switch 29 are connected over conductors 60a–60g to a cable 60h which, in turn, is connected through larger cable 70 to a decimal-to-binary converter 125. Wiper 29c in the 9th level of switch 29 is connected to a source 29d of positive potential in order that a potential may be placed on a selected one of conductors 60a–60g after switch 29 has been actuated to one of its operating positions. In like manner, the fixed contacts in the 9th level of substitution switch 30 are connected over conductors 68a–68g to cable 68h and then through the larger cable 70 to a decimal-to-binary converter 126. Wiper 30c in the 9th level of switch 30 is connected to a source of positive potential 30d in order that a potential may be impressed on one of conductors 68a–68g after switch 30 has assumed one of its operating conditions.

The translation of information through cable 70 from each of the six substitution switches to converters 121–126 is utilized to make a record each time a subscriber's identification number is registered in key board 24. This will be described more particularly hereinafter.

*Autokeys 31–36*

With the apparatus thus far described, the subscriber's identification number is registered in the key board and the representation of this number, which is found on cables 41h, 48h, 51h, 52h, 53h, and 54h, collectively, is changed or converted beyond recognition to a representation on the fixed control contacts of autokeys 31a–36a that is virtually impossible to decipher. If such a conversion were not effected, there would be a definite correlation between the digits of each identification number and the configuration of the cam discs. It would then be a relatively simple task for a cryptographer to determine, from an examination of a subscriber's identification number, the shapes of the various discs in that subscriber's switching mechanism.

As in the case of the substitution switches, the autokeys are conventional seven-position, rotary stepping switches each having a multiplicity of wipers, individually assigned to a predetermined level, which step together across fixed contacts to assume a position determined by the control contact upon which a potential has been placed. Each autokey is paired with a companion having the same identifying reference numeral but with a subscript b, making twelve in all. The twelve autokeys, being operated in pairs, actually constitute six stepping switches with fourteen contact levels in each. Both autokeys of any pair, like 31a and 31b, assume the same operating position and that position is determined by the particular one of the conductors connected to the control contacts of the a section of the pair upon which a positive potential is impressed. For illustrative pairs 31a–31b, the conductor of the group 44a–44g which is energized determines the operating position of both sections of the pair. In like manner, for pairs 32a–32b, 33a–33b, 34a–34b, 35a–35b and 36a–36b the respective controlling conductor groups which determine the operating position of each pair are 49a–49g, 63a–63g, 65a–65g, 59a–59g and 67a–67g.

Conductors 44a–44g which are connected to the fixed control contacts of autokey 31a are also connected through cable 44h to the seven wipers associated with autokey 36a and to the seven wipers of autokey 35b. Conductors 49a–49g in addition to being connected to the fixed control contacts of autokey 32a are connected to the wipers of autokey 31a and over cable 49h to the seven wipers of autokey 36b. Conductors 63a–63g, leading to the control contacts of autokey 33a, are also connected to the seven wipers of autokey 32a and to the seven wipers of autokey 31b. Conductors 65a–65g, which are connected to the fixed control contacts of autokey 34a, are also connected to the seven wipers of autokey 33a and over cable 65h to the seven wipers of autokey 32b. Conductors 59a–59g, in addition to being connected to the fixed control contacts of autokey 35a, are connected over cable 59h to the seven wipers of autokey 34a and also to the seven wipers of autokey 33b. Finally, conductors 67a–67g, which are connected to the fixed control contacts of autokey 36a, are additionally connected to the seven wipers of autokey 35a and over cable 67h to the seven wipers of autokey 34b.

The fixed contacts in the 7th level of autokey 31a are connected over conductors 69a–69g and through a cable 69h to the fixed control contacts of memory selector 37. The fixed contacts in the last level of autokey 31b, which is actually the 14th level of the autokey combination of 31a and 31b, are connected over conductors 70a–70g and through a cable 70h to the fixed control contacts of selector 38. The fixed contacts of the last level of autokey 32a are connected over conductors 71a–71g and through a cable 71h to the fixed control contacts of selector 39. The fixed contacts of the 14th level of the autokey combination of 32a and 32b, which is the last level of autokey 32b, are connected over conductors 72a–72g and through a cable 72h to the fixed control contacts of memory selector 40. The fixed contacts on the last level of autokey 33a are connected over conductors 73a–73g and through a cable 73h to the fixed control contacts of selector 41. The fixed contacts in the last level of autokey 33b are connected over conductors 74a–74g and through a cable 74h to the fixed control contacts of selector 42. The fixed contacts in the last level of autokey 34b are connected over conductors 75a–75g and through a cable 75h to the fixed control contacts of selector 43. The fixed contacts in the last level of autokey 34b are connected over conductors 76a–76g and through a cable 76h to the fixed control contacts of selector 44. The fixed contacts in the last level of autokey 35a are connected over conductors 77a–77g and through cable 77h to the fixed control contacts of selector 45. The fixed contacts in the 14th level of the combination of autokeys 35a, 35b are connected over conductors 78a–78g and through a cable 78h to the fixed control contacts of a conventional seven-point, rotary stepping switch 140 which is part of input transposer 69. The fixed contacts in the last level of autokey 36a are connected over conductors 79a–79g through a cable 79h to the fixed control contacts of another conventional seven-point, rotary stepping switch 141 which is also included in input transposer 69. The fixed contacts in the last level of autokey 36b are connected over conductors 80a–80g and through a cable 80h and to the fixed control contacts of still another rotary stepping switch 142 included in input transposer 69.

The autokeys are similar to one another in construction and may be looked upon as an electrical counterpart of the integrator or adder referred to in the discussion of Figures 1A and 1B predicated upon a modulo 7 system. In other words, if the fixed control contacts of any autokey are numbered 1–7 and the wipers of the several contact levels thereof are similarly numbered 1–7, the connections between the contacts of the several levels are so arranged that energization of a fixed contact assigned a particular number and the concurrent energization of a wiper also assigned a particular number causes a potential to appear on the output terminal (level number 7) of the autokey which has a number designation corresponding to the sum of those particular numbers where the addition is 7 or less and corresponding to the difference of their sum and 7 where the total is in excess of 7.

By way of illustration, assume that the fixed contacts of autokey 31a are numbered from 1–7 starting at the left while the wipers are numbered 1–7 commencing with the wiper connected to conductor 49a and progressing downwardly to the wiper connected to conductor 49g. Further assume that the output terminals to which conductors 69a–69g are connected are numbered 1–7 reading from left to right. If control contact number 3 and wiper number 2 are energized, a potential appears on the output terminal to which conductor 69e is connected, that is, the fifth terminal. The application of the potential to that particular terminal is determined as follows: with control contact number 3 energized, the wipers scan the contacts and stop at column number 3 of the contacts. Since wiper number 2 is itself energized a potential is applied from the contact which it engages through a zigzag type of conductive connection through the several contact levels to output contact 69e.

The twelve autokeys are used to derive twelve "bits" of information which identify the variables of the subscriber decoding mechanism. As already explained, registration of the six-digit identification number assigned to the decoding mechanism establishes operating conditions in the substitution switches 25–30 to produce another number having no apparent relation to the identification number although it is precisely related thereto in a function determined by the transposition steps introduced through the substitution switches. This substitute six-digit number supplies, through the described cable connections leading from the substitution switches to the six pairs of autokeys, two digits to each member of each pair. Those digits are added within the autokey to which they are applied and their summation results in twelve further numbers or "bits" of information which again, being derived in an established pattern from the registered identification number, have a definite and precise relation to the subscriber's switching mechanism for which the computer is determining decoder information. Nine of such "bits" of information from the family of twelve are delivered over the described connections to memory selectors 37–45 and the remaining three are supplied to stepping switches 140–142 in input transposer 69.

The nine "bits" of information supplied to memory selectors 37–45 individually represent an assigned one of the nine indexing discs 12a–15a and 11b–15b included within the decoding mechanism as shown in Figure 1. A further "bit" of information, relating to the active section of fixed cam disc 11a of that mechanism, is supplied from the 9th level of substitution switch 25 over cable 45h to transposition block 55. This is so since the fourth digit of the subscriber's identification number connotes the setting of that disc and also determines the information derived at this switch level. The three "bits" of information supplied to input transposer 69 from the autokeys collectively represent the particular one of the 120 different possible transpositions that may be achieved by a device represented by the block 22f in the subscriber's mechanism.

*Memory selectors 37–45*

Selectors 37–45 are conventional seven-position, rotary stepping switches similar to the substitution switches. There are seven levels in each selector and seven wipers adapted to step across the contacts, one in each level. Each of the seven columns of fixed contacts of selector 37 is connected to a group of vertical bars of an assigned one of seven cross-bar type of transposition blocks or memory units comprising element 46. Each of the seven cross-bar arrangements has a series of seven randomly positioned interconnections from the vertical bars to the horizontal bars as represented in the drawing by dots. Each horizontal bar corresponds to a particular one of the seven possible angular positions of indexing disc 11b as indicated by the numerals 1′–7′. Moreover, each of the vertical bars in each individual cross-bar group or memory unit corresponds to an assigned one of the sections of disc 11b. As illustrated, selector 37 is capable of selecting any one of seven different memory units or blocks and thus any one of seven differently shaped discs may be employed for disc 11b. "Differently shaped" is here used to connote the order in which the seven cam sections appear in the disc. The horizontal bars of blocks 46 are connected in common over conductors 95a–95g to the indicator lamp 61 which displays the required adjustment of knob 16. Lamp 61 may be conventional in construction and responds to a voltage applied to any one of its seven inputs to illuminate a corresponding number from one to seven. Conductors 95a–95g are also coupled through a cable 95h and a series of rectifiers, interposed for isolation purposes, to the wiper contacts of selector 38.

The scanning process of the wipers in selector 37 is interrupted when the wipers engage a contact which has been energized by virtue of a voltage on one of conductors 69a–69g as determined by the output of autokey 31a. In their selected position, the wipers are connected to the vertical bars of a particular one of the transposition blocks or memory units. The selected block indicates the specific configuration of the disc **11*b*** in the switching mechanism corresponding to the registered identification number and for which the computer is calculating information. The designation of a particular cross point within the selected block, to particularize as to a certain section of that cam disc, will be explained presently.

The transposition blocks 47–54 are similar to blocks 46. However, in the case of blocks 47, 49, 51 and 53, the horizontal bars represent the depths or cam sections of discs **12*a*, 13*a*, 14*a*, and 15*a*, respectively while the vertical bars represent the angular positions of those discs. Blocks 48, 50, 52 and 54 represent respectively discs 12*b*, 13*b*, 14*b* and 15*b***. Memory selectors 37–45 are actuated in accordance with information supplied from assigned ones of the autokeys to select the particular cross-bar arrangements or memory units which particularize as to the configurations of the discs in the subscriber's transposition mechanism. They respond to further excitation, to be described hereinafter, to particularize as to specific sections or depths of such discs in order to decode a given program.

*Adders 57–60 and their effect on selectors 37–45*

Transposition block 55 comprises another cross-bar arrangement having seven vertical bars individually representing one of the depths or cam sections of fixed indexing disc **11*a* of the subscriber's decoder and having seven horizontal bars individually connected to one of conductors 45*a*–45*g* leading from substitution switch 25. Interconnections are made at various points between the vertical and horizontal bars in a random pattern. A voltage appears on one of conductors 45*a*–45*g* in accordance with the 4th digit of the subscriber's identification number. This voltage is transferred from the horizontal bar on which it is impressed to one of the vertical bars determined by the particular cross-connection including that horizontal bar. The vertical bars connect to seven fixed control contacts of a modulo 7 adder 56 which comprises a conventional seven-position, rotary stepping switch. This adder is very similar to autokey 31a. Its fixed control contacts are numbered 1–7 to designate the several depths or sections of cam disc 11*a***.

Figure 24:
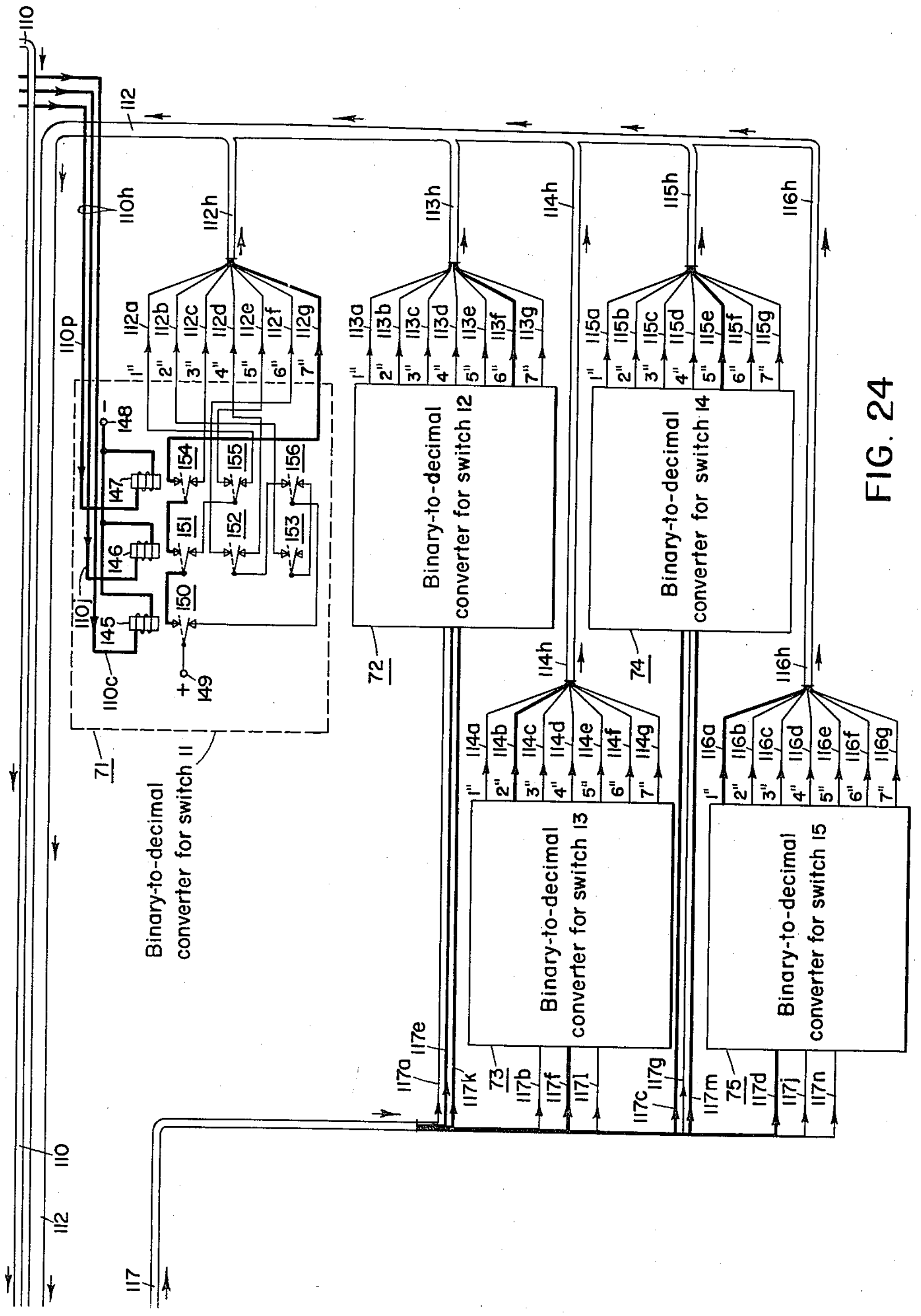

Adder 56 has seven contact levels and a wiper associated with each. These wipers are connected over conductors **112*a*–112*g* to the seven output conductors of a binary-to-decimal converter 71 (Figure 24). These output conductors correspond to the output conductors from switch 11 and, accordingly, are designated 1″ to 7″. To accomplish decoding, switch 11 must connect to a particular output conductor and the corresponding conductor from converter 71 is energized to apply a voltage to the wiper of adder 56 to which it connects. This correlates the wipers of adder 56 to the output conductors of switch 11 as shown by the numerals 1″–7″** associated with the wipers on the drawing.

The fixed contacts of adder 56 are wired together in a manner similar to the autokeys. When the wipers thereof are stepped to scan their contacts, they stop when the energized one of the fixed contacts is encountered. This contact identifies the active section of cam disc **11*a*. At the same time, converter 71 by applying a potential to one wiper of the adder identifies the output conductor to which switch 11 is to connect. Then a computation is made automatically, per force of the wiring within adder 56, to determine the particular depth or section of cam disc 11*b* which must be made effective in order to position switch 11 to contact the particular output conductor. The output terminals of adder 56 therefore represent the several depths or sections 1–7 of cam disc 11*b*; for convenience, the numerals 1–7** have been placed on the drawing.

These output terminals are connected over conductors **96*a*–96*g* and through a cable 96*h* to the movable wiper contacts of selector 37. A potential is impressed from the energized output terminal to the assigned one of the wipers of selector 37 which has already been positioned to a selected one of its vertical columns of fixed contacts, selecting a memory unit that represents the configuration of cam disc 11*b* in the subscriber's switching mechanism. The voltage on the wiper of selector 37 indicates the depth or section of cam disc 11*b* which is required and is translated along one of the vertical bars of the transposition block connected to the selected vertical column of fixed contacts within selector 37 in order to determine the position or angular orientation of disc 11*b* which places the required cam section into active engagement with the intersecting mechanism 11*c* controlling switch 11. The required position of cam disc 11*b* is pin pointed by the intersection of the vertical bar within selector 37 with one of conductors 95*a*–95*g*. Indicator 61 then displays a selected one of the seven numbers 1′–7′ to represent the required dial setting for switch knob 16**.

The information thus ascertained, pertaining to the position of disc **11*b*, is passed on via cable 95*h* to the wipers of selector 38 in order to determine the particular active depth or section of cam disc 12*a* which results from this angular position of disc 11*b* because both are rigidly connected to the same shaft 16*a*. Thus, a voltage from a wiper in selector 38 appears on a selected one of the vertical bars in one of the memory units in element 47 and is transferred through a cross-bar connection to a corresponding horizontal bar which represents the active depth of disc 12*a***.

The horizontal bars of transposition blocks 47 are connected over conductors **97*a*–97*g* and through a cable 97*h* to the fixed control contacts of a seven-position adder 57. This adder is similar to adder 56. A selected one of its fixed control contacts is energized in accordance with the previous determination in transposition blocks 47 of the active section of cam disc 12*a*. This disc, in conjunction with cam disc 12*b* and intersecting mechanism 12*c*, positions switch 12 with respect to the output conductors 1″–7″. The particular output conductor to be engaged by switch 12 is represented by a correspondingly identified output conductor of binary-to-decimal converter 72 and that conductor energizes an assigned one of the wipers of adder 57, being connected therewith by means of cable 113*h*. The wipers of the adder stop their scanning process at the vertical column corresponding to the energized fixed control contact and by means of the interlevel contact connections of the adder a particular output terminal is energized. This terminal corresponds in numeral designation to the depth or section of cam disc 12*b* which must be activated to cooperate with the predetermined adjustment of cam disc 12*a* to position switch 12. A cable 99*h*** connects the output terminals of adder 57 to wipers of selector 39.

The wipers of selector 39 step across the several contact levels until one engages the fixed control contact to which a potential has been applied from autokey 32a by way of a selected conductor of the series **71*a*–71*g*. This interruption of the scanning action identifies the particular transposition block 48 which identifies the configuration of cam disc 12***b* in the decoding mechanism in question. The energized wiper of the selector, energized through adder 57, singles out a particular one of the vertical bars of the selected transposition block 48, thus identifying by numeral the cam section or depth which is to be made effective. The cross connection of that vertical bar with a horizontal bar within that transposition block translates the applied "bits" of information to a determination of the angular orientation of disc 12*b* properly to adjust switch 12 to engage the desired output conductor. This determination is manifest by an illumination of the correspondingly identified indicator lamp 62. The number illuminated correpsonds to the position to which switch knob 17 is to be set.

The remaining selectors and adders operate in substantially the same manner to determine the settings required for the remaining switch control knobs in order to obtain the correct interconnections of input circuits 22*a*–22*e* to output conductors 1″–7″ in the subscriber's decoding mechanism.

Specifically, conductors 98*a*–98*g* from selector 39 are connected over a cable 98*h* and through a series of isolating diodes to the wiper contacts of selector 40. The horizontal bars of the transposition blocks 49 are connected over conductors 101*a*–101*g* and through a cable 101*h* to the fixed control contacts of adder 58 to position the wipers thereof in accordance with the particular section of disc 13*a* which becomes active when knob 17 is adjusted as required. Information from converter 73 is received over conductors 114*a*–114*g* connected to the wipers of adder 58. This information specifies the output conductor to be engaged by switch 13. The output terminals of adder 58 are connected over a series of conductors 103*a*–103*g* and through a cable 103*h* to the wiper contacts of selector 41. This selector seeks out the memory unit which represents the shape of cam disc 13*b* in the subscriber's decoder and then, in response to a voltage applied to one of its wipers from adder 58 designating the desired section of cam 13*b*, effectively finds the angular position of disc 13*b* which places that section into position to cooperate with the active section of disc 13*a* to actuate switch 13.

The horizontal bars of transposition blocks 50 are connected over conductors 102*a*–102*g* to indicator lamp 63 to display the setting of knob 18 that must be made by the subscriber. Conductors 102*a*–102*g* are also connected over a cable 102*h* and through a series of isolating diodes to the wipers of selector 42 to effectively find the particular depth of disc 14*a* which is placed in active engagement with operating mechanism 14*c* of switch 14 when knob 18 is positioned as indicated by lamp 63.

The horizontal bars of transposition blocks 51 are connected over conductors 104*a*–104*g* and through a cable 104*h* to the fixed control contacts of adder 59 to indicate the active depth of cam disc 14*a*. The wipers of adder 59 are connected to conductors 115*a*–115*g* to receive information from converter 74 indicating the output conductor to be chosen by switch 14. Adder 59 utilizes both such "bits" of information to compute the depth or section of indexing disc 14*b* required to achieve the correct actuation of switch 14. Conductors 106*a*–106*g* couple the output terminals of adder 59 through a cable 106*h* to the wiper contacts of selector 43 to find the position to which knob 19 must be adjusted in order to place the proper indexing surface or depth of disc 14 into position.

The horizontal bars of transposition blocks 52 are connected over conductors 105*a*–105*g* to indicator lamp 64 to illuminate a number from 1 to 7 indicative of the position to which knob 19 must be adjusted by the subscriber. Conductors 105*a*–105*g* are also connected over a cable 105*h* and through a series of isolating diodes to the wiper contacts of selector 44. Selector 44 conveys information regarding the positioning of knob 19 to the selected memory unit or cross bar arrangement in blocks 53 in order to find the particular depth of disc 15*a* which is actively engaged with intersecting mechanism 15*c* when knob 19 has been adjusted.

The horizontal bars of transposition blocks 53 are connected over conductors 107*a*–107*g* and through a cable 107*h* to the fixed control contacts of adder 60 to provide information concerning the active depth of disc 15*a*. Adder 60 receives information from converter 75 over conductors 116*a*–116*g* as to the output conductor switch 15 must engage. Tht adder responds to this information and to the information representing the active depth of disc 15*a* to provide at its output terminals a representation of the section of cam disc 15*b* which must be employed properly to adjust switch 15. The output terminals of adder 60 are connected over conductors 108*a*–108*g* and through a cable 108*h* to the wiper contacts of selector 45. These wipers are positioned to a vertical column of fixed contacts determined by information supplied from autokey 35a to couple to the one of the memory units or blocks in element 54 which represents the pattern of cam disc 15*b*. A potential on one of the wipers of selector 45 indicates the section of disc 15*b* that must be placed into engagement with intersecting mechanism 15*c* and this depth is found in the memory unit to indicate over one of the horizontal bars of locks 54 the position to which knob 20 must be adjusted. These horizontal bars are connected over conductors 109*a*–109*g* to indicator lamp 65 which displays to the operator the required setting for knob 20.

The manner in which information, denoting the connections of switches 11–15 in relation to output conductors 1″–7″ for a selected subscription program, is supplied to the wiper contacts of adders 57–60 will now be considered. The computer as illustrated is capable of making the necessary computation for any of thirty different programs and the result of the computation, the information for distribution to the subscriber, is different for each. For each program certain information must be predetermined, namely, the particular destination or routing of each of the five frequencies $f_1$–$f_5$, employed in transmitting coding information and found on the input circuits 22*a*–22*e* of the subscriber's decoding mechanism, in relation to the output circuits 1″–7″. Additionally, for the benefit and use of the class referred to as "cost" subscribers, information must be preselected as to the cost of each such program. All this information is set up in the computer in storage devices to be available when required in making computations. The storage device is the master code patch board of Figure 4.

*Master code patch board 66*

In the illustration, the master code patch board 66 comprises thirty columns of contacts, with nineteen contacts in each column. Each column stores information for an assigned one of the thirty programs and, for convenience, the columns are labeled A1–F5. A continuous vertical bar is associated with each column and these bare are connected in common to a source of positive unidirectional potential 66*j*. Voltage may be placed on any of the various contacts in each column by jumpers extending from the contacts to the vertical bar.

The first four contacts in each column, reading from the top down, are devoted to cost information and since they may be connected to the vertical bar in any of sixteen combinations, they permit of sixteen different cost denominations. However, for convenience only nine different combinations are used, representative of nine different costs. The remaining contacts in each column are separated into five groups of three each and each such group represents the routing of an assigned one of the code frequencies $f_1$–$f_5$, as indicated on the right hand side of patch board 66. Since there are seven output conductors 1″–7″ concerned in the routing of the code frequencies, seven patterns of connections are employed so that the pattern chosen for any particular 3-contact group indicates to which of the seven output circuits 1″–7″ one of switches 11–15 must be connected for proper routing of the code frequency represented by that group.

The representation of the cost and the frequency routing take a binary form in order to minimize the number of interconnections required. As shown by the random manner in which the jumpers connect the contacts to the several vertical bars, a wide variety of different code and cost combinations are employed for the thirty different programs. A code reader 68 reads the circuit connections established in a selected one of the thirty columns of the patch board in the computing process.

*Code reader 68*

Code reader 68 comprises another conventional rotary stepping switch having thirty positions each of which is associated with an assigned column of patch board 66 and, therefore, with a particular program. There are nineteen different contact levels and a wiper is provided for each. The contacts in each level are connected through a cable 81 to the contacts of a corresponding horizontal row of contacts of patch board 66. In this manner, each of the contacts of patch board 66 connects to a corresponding contact of the code reader 68. Thus, if a voltage appears on a contact in patch board 66 that same voltage appears on the corresponding contact in the code reader. The circuit conditions established in patch board 66 for a particular program are read out when the wipers of code reader 68 are stepped to the column of contacts associated with that program.

*Program selector 67*

Program selector 67 is provided in order to actuate code selector 68 to any such column of fixed contacts. It is a rotary stepping switch having six operating positions and five wipers. The six fixed control contacts are connected over conductors *56a–56f* to the punch-actuated switches A–F in key board 24 and the five wipers are connected over conductors *55a–55e* to the five punch-actuated switches 1–5 in the "program" section of key board 24. Each of the remaining thirty fixed contacts in selector 67 is connected to an assigned one of the fixed control contacts of code reader 68.

Specifically, the fixed contacts in the first column of selector 67 are connected over conductors *85a–85e*, through cable *85h*, to the first five control contacts of reader 68; these contacts are associated with programs designated A1–A5. The second column of fixed contacts of selector 67 are connected over conductors *86a–86e*, through cable *86h*, to the next set of five control contacts of reader 68 which are devoted to programs designated B1–B5. The third column of fixed contacts of selector 67 are connected over conductors *87a–87e*, through a cable *87h*, to the five control contacts of reader 68 associated with programs C1–C5; the next set of fixed contacts of selector 67 are connected over conductors *88a–88e*, through a cable *88h*, to the control contacts of reader 68 devoted to programs D1–D5; the fifth column of contacts of selector 67 are connected over conductors *89a–89e*, through a cable *89h*, to the control contacts of reader 68 which are associated with programs E1–E5; and the last column of contacts in selector 67 are connected over conductors *90a–90e*, through a cable *90h*, to the last set of five control contacts of reader 68, which contacts are devoted to programs designated F1–F5.

Each time one of the keys A–F in key board 24 is actuated, a voltage appears at the particular one of the control contacts of selector 67 to which the key is connected so that the scanning of the wipers of that selector stops when that selected position has been reached. Additionally, when one of the program keys 1–5 of the key board is operated, a voltage appears on the associated one of the wipers of selector 67 and is transferred to the fixed control contact of code reader 68 which corresponds to the particular program selected in key board 24.

The necessary information, indicia of cost and routing of coding frequencies $f_1$–$f_5$, of the selected program is available in the form of selective excitation of those wipers of code reader 68 which engage energized contacts in the column of contacts of the reader assigned to the program selected. Before making a computation on the basis of that information, it is necessary to take into consideration that the decoding mechanism of each subscriber includes a transposition block 22f as represented in Figure 1. That transposition block establishes a particular one of 120 different transpositions between input circuits *22a–22e* and the inputs to switches 11–15 of that mechanism. The computer under discussion, accordingly, operates on the combination or information derived from the code reader to allow for that transposition. This function takes place in the input transposer 69.

*Input transposer 69*

As mentioned hereinbefore, autokeys 35b, 36a and 36b supply information to input transposer 69 over cables *78h*, *79h* and *80h*, respectively. Seven-position stepping switch 140 of transposer 69, like the other stepping switches employed in the computer, steps a series of wipers across nine levels of seven fixed contacts each to a point determined by the information supplied from autokey 35b.

Switch 141 of the transposer has twelve levels of seven fixed contacts each and similarly steps its wipers across to a position determined by autokey 36a, and rotary switch 142 of the transposer has fifteen levels of seven fixed contacts each and fifteen wipers that are stepped to a position determined by the output of autokey 36b.

The wiper contacts of the code reader 68, relating to the frequency routing to be employed in the subscriber's decoding mechanism, are coupled to the wipers of the three stepping switches 140–142. Specifically, the three wipers for code frequency $f_1$ are connected over conductors *92a–92c* to the wipers of the 1st, 4th and 7th levels of stepping switch 140, respectively. The wipers which pertain to code frequency $f_2$ are connected over conductors *92d–92f* to the wipers of the 2nd, 5th and 8th levels respectively of switch 140. The wipers which pick off information from code reader 68 to indicate the required destination for code frequency $f_3$ are connected over conductors **92*g*, 92*j*, 92*k* to the wipers for the 3rd, 6th and 9th levels respectively of switch 140. The wipers of reader 68 deriving information indicating the required routing of code frequency $f_4$ for the program selected and are connected over conductors 92*l*–92*n* to the 1st, 5th and 9th levels of stepping switch 141. Finally, wipers which derive information from the fixed contacts of reader 68 representing the required routing for signal bursts of code frequency $f_5$ are connected over conductors 92*p*–92*r*** to the 1st, 6th and 11th wipers respectively for stepping switch 142.

The contacts of the first, second and third levels, counting from the top down, of stopping switch 140 are interconnected to achieve all possible permutations thereof. More particularly, if the contacts in these levels are numbered 1–7, reading left to right, the permutations which they represent as the wipers of those levels scan from left to right are indicated in the following table:

| | | | | | | |
|---|---|---|---|---|---|---|
| 92*a* | 92*a* | 92*g* | 92*g* | 92*d* | 92*d* | 92*a* |
| 92*d* | 92*g* | 92*a* | 92*d* | 92*g* | 92*a* | 92*d* |
| 92*g* | 92*d* | 92*d* | 92*a* | 92*a* | 92*g* | 92*g* |

All possible permutations are presented in the first six columns and the seventh is a repetition of the first.

In like manner, the contacts in levels 4, 5 and 6 of stepping switch 140 are cross connected to present all possible permutations for conductors **92*b*, 92*e* and 92*j* whereas the contacts of the seventh, eighth and ninth levels, through an identical pattern of interconnections, provide the same permutations in respect of conductors 92*c*, 92*f* and 92*k*. In view of this pattern of interconnections, the potentials applied to conductors 92*a*–92*k*** to represent the routing of code signal frequencies *f*1, *f*2 and *f*3 are applied from the wipers of stepping switch 140 to the contacts thereof in accordance with the position to which the wipers are permitted to advance in their scanning of the contact levels as determined by the excitation of the input contacts of the switch through conductors **78*a*–78*g***. Where the wipers are arrested, their potential condition is transferred to the contacts of the stepping switch that are instantaneously engaged and appear on the output conductors at the extreme right end of that switch in accordance with which one of the seven possible positions the wipers have been permitted to assume.

The output terminals of the first three contact levels of switch 140 are connected to the wipers for the 2nd through the 4th levels of switch 141, the output terminals for the 4th through the 6th contact levels of switch 140 are connected to the wipers for the 6th through the 8th levels of switch 141, and the output terminals for the 7th through the 9th contact levels of switch 140 are connected to the wipers for the 10th through the 12th levels of switch 141. Switch 141 effectively adds one more series of input conductors, those concerning the routing of code frequency $f_4$, to input transposer 69 and in its various operating positions provided all possible transpositions in respect of code frequencies $f_1$–$f_4$. More particularly, the conductors **92*l*–92*n*** from code reader 68 which carry the information representing the required routing for code frequency $f_4$ are added to the input transposer 69 in switch 141 and, in view of the described connections, the four code frequencies $f_1$–$f_4$ may appear at the output terminals of switch 141 in all possible orders.

The output terminals for the 1st through the 4th levels of switch 141 are connected to the wipers for the 2nd through the 5th levels of stepping switch 142. Similarly, the output terminals for the 5th through the 8th levels of switch 141 are connected to the wipers for the 7th through the 10th levels of switch 142, and the output terminals for the 9th through the 12th levels of switch 141 are connected to the wipers for the 12th through the 15th levels of switch 142. The wipers of switch 142 add the conductors from code reader 68 which introduce the information regarding the required destination for the code signal bursts of frequency $f_5$. Through the pattern of connections for this switch together with those of switches 140 and 141 the entire range of 120 transpositions may be realized. The particular one of the range of 120 transpositions which is appropriate for the subscriber for whom a computation is being made is singled out by the positions to which the wipers of stepping switches 140, 141 and 142 are adjusted. This adjustment is accomplished by the selective excitation of one contact of the bank of fixed control contacts of each switch to arrest the scanning process of the wipers. The control contact is chosen, as already explained, by the conductor of each of cables **78*h*, 79*h* and 80*h*** to which a potential has been applied by the operation of autokeys 35b, 36a and 36b, respectively. And, of course, these autokeys are actuated in specific response to the registration of the subscriber's identification number.

The selective positioning of the wipers of these switches, simulating as it does the function of transposition block 22f in the subscriber's decoding mechanism, gives recognition to the specific assignment of input conductors **22*a*–22*e* of the decoder to the switches 11–15 under the control of transposition block 22f. More particularly, the three output conductors 110*c*, 110*j*, 110*p* from transposer 69, constituting cable 110*h*, lead to a binary-to-decimal converter 71 which develops particular information for switch 11. The selective positioning of the wipers of the transposer, simulating in effect the function of transposition block 22f particularizes as to which of the code signal frequencies $f_1$–$f_5$, is to be assigned over these conductors to switch 11. In other words, it picks out one trio of contacts from code reader 68 assigned to a particular code frequency and transfers the potential conditions thereof to the specified output conductors 110*c*, 110*j* and 110*p*** of transposer 69.

In similar fashion a unique trio of output conductors from transposer 69 leads to converter 72 assigned to switch 12 while other three-conductor groups lead to converters 73, 74 and 75 assigned to switches 13, 14 and 15 respectively. However, the paths of such conductors to converters 72–75 extend through cost transposer 76 for reasons to be made apparent presently.

Briefly, each of these converters receives in binary form the information or direction which dictates the particular one of the output conductors 1″–7″ of the decoding mechanism to which the coding frequency they represent is to be routed. The converters interpret or read the binary information and convert it to a decimal indication of the particular output conductor, all of which will be described hereinafter.

Before considering such converters in detail, especially since cost transposer 76 intervenes between transposer 69 and many of such converters, the operation of the cost transposer will be explained.

*Cost transposer 76*

The cost transposer is functionally effective in the computer only in those instances when a computation is being made for one of the class referred to as "cost subscribers." Each member of that class has a decoding mechanism which includes a cost transposer which, in all material respects, may be the same as that of transposer 76 to be described presently.

The transposer introduces a transposition in series or in cascade with that of transposition block 22f and the transposition which it introduces changes each time a coin, such as a 25 cent piece, is inserted into the coin receptacle controlling the decoding mechanism. Hence, after the required number of coins have been inserted, in accordance with the program cost, a known transposition will have been made; as a consequence, transposer 76 of the computer is likewise a variable transposition device for simulating the equivalent or counterpart of the cost transposer in the cost-subscriber's decoding mechanism.

When the wipers of code reader 68 are stepped across the several contact levels thereof in response to a program selection, made through the actuation of key board 24, the first four wipers, reading from the top down, "pick off" the cost information for the program selected. They are connected over conductors 91*a*–91*d* and through a cable 91*h* to an input of binary-to-decimal converter 77 of Figure 23. The information found on the contacts in code reader 68 representing the cost information is in binary form and converter 77 which is of conventional construction provides a voltage on any one of ten output leads individually indicating one of ten charges, including a zero charge for those subscribers who are not operating on a cost basis. Converter 77 may be somewhat similar to converter 71 which is to be described in detail hereinafter.

As mentioned before, conductors 46*a*–46*g* are connected from the tenth level of fixed contacts of substitution switch 25 to seven horizontal bars in patch board 77j, a single vertical bar of which is connected to another input of converter 77. Interconnections indicated by the dots, are made between the vertical bar and certain of conductors 46*a*–46*g* so that upon the registration of the identifying number of any cost subscriber switch 25 energizes one of conductors 46*a*–46*g* which terminates in such an interconnection whereas the registration of a non-cost subscriber number does not result in a potential being applied through such an interconnection to the vertical bar of board 77j.

In other words, the 4th digit in the identification number, which determines the particular one of conductors 46*a*–46*g* upon which voltage may be found controls as to whether or not the voltage is transferred over one of the cross connections to the vertical bar and thence to converter 77. The presence or absence of a voltage on the vertical bar in patch board 77j, determines whether or not converter 77 responds to the cost information supplied over cable 91*h* from code reader 68. If the subscriber is not a cost subscriber, no voltage appears on the vertical bar and converter 77 energizes the first control contact of cost transposer 76, which comprises a conventional ten-position, nineteen level, stepping switch, dictating a zero charge for the basis of the computation for the given subscriber no matter what cost information may have been received from reader 68. On the other hand, where the computation is being made for a cost subscriber, transposer 76 responds to the cost information derived from the code reader and further responds to information from input transposer 69.

The output terminals for the 1st and 2nd contact levels of stepping switch 142 are connected over conductors 110*a* and 110*b*, respectively, and through a cable 110 to the wipers for the 1st and 2nd contact levels of cost transposer 76. The output terminals for the 4th through the 7th contact levels of switch 142 are connected over conductors 110*d*–110*g*, respectively, to the wipers for the 3rd and 5th through 7th contact levels of cost transposer 76. The output terminals for the 9th through the 12th contact levels of switch 142 are connected over conductors 110*k*–110*n*, respectively, and through cable 110 to the wipers for the 8th and 10th through 12th contact levels of cost transposer 76. The output terminals for the last two contact levels of switch 142, namely the 14th and 15th levels, are connected over conductors 110*q* and 110*r*, respectively, and through cable 110 to the wipers for the 13th and 15th contact levels of switch 76. The output terminals for the 3rd, 8th and 13th contact levels of switch 142 are connected over conductors 110*c*, 110*j*, and 110*p*, respectively, which comprise a cable 110*h*, to the input terminals of binary-to-decimal converter 71, as stated before.

The fixed contacts and the wipers for the 4th, 9th and 14th levels of cost transposer 76 are interconnected, as shown, in order to transpose the incoming circuits of the wipers to any of a number of possible patterns. If the identification number of a cost subscriber is registered, a voltage appears on the vertical bar in patch board 77j and binary-to-decimal converter 77 is permitted to respond to the cost information supplied thereto from code reader 68 over conductors 91*a*–91*d*. This information is received in binary form and is converted to decimal form in which a potential appears on only that output conductor of the converter which corresponds to the cost dictated by the code reader. This voltage is impressed on a corresponding one of the fixed control contacts of cost transposer 76 to indicate a selected one of nine different charges, increasing in increments of 25¢, as indicated by the cost figures of the drawing. The wipers of transposer 76 are stepped to the column of fixed contacts corresponding to the cost for the program selected and another transposition is introduced duplicating that effected by the subscriber's cost transposer in response to receipt therein of the identical program price.

As will be apparent hereinafter, the output conductors from transposer 76 may be considered as comprising another series of three-conductor groups which is an extension of the type of conductor pattern introduced in patch board 66, extended through code reader 68 and employed in input transposer 69 in translating routing information with one trio of conductors representing one of the code signal frequencies $f_1$–$f_5$. Suffice it here to identify the triads of conductors from transposer 76; they are as follows: group I includes conductors 117*a*, 117*e* and 117*k*; group II comprises conductors 117*b*, 117*f* and 117*l*; group III comprises conductors 117*c*, 117*g*, and 117*m*; while the final group includes conductors 117*d*, 117*j* and 117*n*.

Just as transposer 69 interchanged the association of code signal frequencies in respect of its several three-conductor output groups in accordance with the controlled positions of the wipers of switches 140, 141 and 142, so too does cost transposer 76 effect a transposition of frequency assignment with respect to its conductor groups when its wipers are in any position other than the first or the extreme left-hand position as viewed in Figure 23. The only significant difference in the transpositions effected by these mechanisms is that transposer 69 operates upon all five three-conductor groups whereas transposer 76 merely operates upon four since one group of three-conductors leads directly from transposer 69 to converter 71 for switch 11.

In addition to effecting a transposition as described, unit 76 gives a visual display of the cost of the program for which a computation is being made. To that end, the wipers for the 16th, 17th, 18th and 19th contact levels of cost transposer 76 are connected in common and to a source of positive potential 76*j* and most of the fixed contacts in those levels are connected to an input circuit of one of three cost indicator lamps 78–80. These indicator lamps collectively reveal the cost of the program selected. Lamp 78 indicates hundreds of cents or dollars, lamp 79 tens of cents, and lamp 80 simply cents. Lamp 78 has two input circuits; voltage appearing on one effects the display of the numeral one and voltage applied to the other displays the numeral two. Lamp 79 has four input circuits for selectively displaying zero, two, five or seven, and lamp 80 has two input circuits to display either the number 0 or 5. For convenience appropriate numbers have been placed on the drawing alongside each input to lamps 78–80.

The fixed contacts in the 19th level of cost transposer 76 are connected over a series of conductors and through a cable 83 to the input circuits of decimal-to-binary converter 129.

*Converters 71–75*

As mentioned before, in order to minimize the circuitry in the computer the information obtained from code reader 68, relating to the routing of code frequencies $f_1$–$f_5$ in respect of conductors 1″–7″, has been represented in binary form and thus it is necessary to convert such binary information to its decimal equivalent. This is accomplished in identical converters 71 to 75.

The output terminals from the 1st, 6th and 11th contact levels of cost transposer 76 are connected over conductors 117*a*, 117*e* and 117*k*, respectively, and through a cable 117 to the input circuits of binary-to-decimal converter 72. The output terminals for the 2nd, 7th and 12th contact levels of cost transposer 76 are connected over conductors 117*b*, 117*f*, 117*l*, respectively, and through cable 117 to the input circuits of binary-to-decimal converter 73. The output terminals for the 4th, 9th and 14th contact levels of transposer 76 are connected over the conductors 117*c*, 117*g* and 117*m* to the input terminals of binary-to-decimal converter 74. The output terminals for the 5th, 10th and 15th contact levels are connected over conductors 117*d*, 117*j* and 117*n* and through cable 117 to the input circuits of binary-to-decimal converter 75. Converter 71 connects directly over conductors 110*c*, 110*j* and 110*p* to transposer 69.

Converter 71 has three relays 145–147, each of which has one terminal connected to an incoming circuit and its other terminal connected to a source of negative potential 148. A family of seven switches 150–156 are operated by the three relays in order to impress a positive voltage from a source 149 to any one of seven output conductors 112*a*–112*g* connected over cables 112*h* and 112 to adder 56. The selected one of the seven conductors 112*a*–112*g* upon which voltage from source 149 is placed indicates the particular one of the seven output circuits 1″–7″ to which the subscriber's switch 11 must be positioned, and thus for convenience this correlation has been shown on the drawing by the use of the indicia 1″–7″ associated with conductors 112*a*–112*g*.

When relay 145 alone is energized, a potential from source 149 is transferred through the make contact of switch 150 and the break contacts of switches 151 and 155 to conductor 112*a* to indicate that switch 11 must be adjusted to output circuit 1″. When relay 146 alone is energized, a voltage from source 149 is impressed through the break contacts of switches 150 and 156 and through the make contacts of switch 153 to conductor 112*b*. When relays 145 and 146 are both energized, a potential is supplied from source 149 through the make contacts of switches 150 and 151 and through the break contacts of switch 154 to conductor 112*c*. When relay 147 alone is energized, voltage is supplied through the break contacts of switch 150, the make contacts of switch 156 and through the break contacts of switch 152 to conductor 112*d* indicating output circuit 4″. When relays 145 and 147 are both energized, a potential is impressed through the make contacts of switch 150, the break contacts of switch 151 and the make contacts of switch 155 to conductor 112*e*. When relays 146 and 147 are both energized, positive potential is applied through the break contacts of switch 150, and the make contacts of switches 156 and 152 to conductor 112*f*. Finally, when all three relays are energized, a potential from source 149 is transferred through the make contacts of switches 150, 151 and 154 to conductor 112*g* indicating that switch 11 must be set so that it is connected to output circuit 7″.

The seven output conductors 113*a*–113*g* of converter 72 are connected over cable 113*h* and larger cable 112 to the wiper contacts of adder 57. The output conductors 114*a*–114*g* of converter 73 are connected through cables 114*h* and 112 to the wiper contacts of adder 58; output conductors 115*a*–115*g* of converter 74 are connected through cables 115*h* and 112 to the wiper contacts for adder 59; and output conductors 116*a*–116*g* from converter 75 are connected through cables 116*h* and 112 to the wiper contacts of adder 60.

Converter 71 supplies information to adder 56 indicative of the exact position to which switch 11 must be connected. Similarly converters 72–75 supply information to adders 57–60, respectively, concerning the specific positions to which switches 12–15, respectively, must be connected to satisfy the requirements imposed by the particular program selected.

*Tape perforator 82*

When a subscriber's identification number has been registered in the key board and the code computing process takes place to indicate to the operator the required knob settings, it is desirable to make a record of the transaction. Accordingly, tape perforator 82, which is conventional in construction, is connected to the outputs of decimal-to-binary converters 121–129 in order to store the necessary information. The subscriber's identification number is conveyed to the perforator through cables 47*h*, 50*h*, 64*h*, 66*h*, 60*h*, and 68*h* from substitution switches 25–30, respectively. Conductors 56*a*–56*f* and conductors 55*a*–55*e* from the program keys in key board 24 are connected over cables 56*h* and 55*h*, respectively, to decimal-to-binary converters 127 and 128 in order to supply information to tape perforator 82 as to the particular program selected. The cost for the selected program is represented by information from cost transposer 76 supplied over cable 83 to converter 139. Of course, the decimal-to-binary converters 121–129 have been shown to minimize the circuitry supplied to the tape perforator. Thus, perforator 82 receives three "items" of information—the subscriber's identification number, the program selected, and the cost for that program.

These several "items" are individually registered or recorded on tape in conventional manner.

*Illustrative computation*

In order to obtain a more clear understanding of the invention, it is helpful to describe the operation of the entire computer in response to the registration of one typical identification number and a typical program selection. It will be remembered that throughout the drawings the heavier solid and broken construction lines indicate the active circuits for the identification number presently to be described.

Assume that the particular subscriber selected as an example has previously been given the identification number 374625. Assume now that the subscriber calls the subscription television exchange and requests the proper switch setting information for his unique decoding mechanism required to decode or unscramble a certain television program designated program D3. The operator depresses the proper keys in key board 24 to register the identification number and the program selection. As a result, voltage from source 24*a* is placed on conductor 48*c* (in response to the registration of the first digit 3), on conductor 53*g*, on conductor 51*d*, on conductor 41*f*, on conductor 54*b*, and on conductor 52*e* (in response to the registration of the sixth digit). Additionally, voltage is placed on conductors 56*d* and 55*c* in response to the registration of the program number D3.

The potentials which have been applied to the six conductors associated with the identification number are transferred to the corresponding fixed control contacts in substitution switches 25–30 so that the wipers of those switches stop in the position determined by the control contact upon which voltage is found. Specifically, switch 25 is stepped to the column of contacts including the fixed control contact connected to conductor 41*f*, as shown by the extensions of the wipers in broken line construction. Switch 26 steps to the column of contacts including the control contact connected to conductor 48*c*, switch 27 is stepped to the contact position determined by conductor 51*d*; switch 28 is actuated to the position determined by potential on conductor 52*e*; switch 29 is actuated to the position determined by potential on conductor 53*g*; and substitution switch 30 is stepped to the operating position including the control contact connected to conductor 54*b*.

Potential from source 25*b* is conveyed over wiper 25*a*, conductor 43*f*, and conductor 49*d* to one of the fixed control contacts of autokey 32a, to the wiper of the fourth level of autokey 31a, and to the wiper of the fourth level of autokey 36b. Voltage from source 26*b* is impressed over wiper 26*a*, conductor 42*c* and conductor 44*g* to a control contact of autokey 31a, to a wiper of autokey 35b, and to wiper of autokey 36a. Potential from source 27*b* is transferred over wiper 27*a*, conductors 62*d*, 65*e* to a control contact of autokey 34a, to a wiper of autokey 33a, and to a wiper of autokey 32b. Source 28*b* impresses a potential over wiper 28*a*, conductors 61*e*, 63*e* to a control contact of autokey 33a, to a wiper of autokey 32a, and to a wiper of autokey 31b. Voltage from source 29*b* is transferred through wiper 29*a*, conductors 58*g*, 67*a* to a control contact of autokey 36a, and to wipers of autokey 35a and autokey 34b. A potential from source 30*b* is conveyed over wiper 30*a*, conductors 57*b*, 59*c* to a control contact of autokey 35a, and to wipers of autokeys 34a and 33b. The autokeys step across to assume positions dictated by the control contacts upon which voltage is applied, as indicated by the broken line alternate positions of the wipers for all of the autokeys.

A potential from one of sources 25*b*–30*b* is translated to a selected output circuit of each of the twelve autokeys. Specifically, the voltage from source 25*b* which has been applied over conductor 49*d* to a wiper of autokey 31a is further applied over that wiper and through the circuit of autokey 31a shown in heavy line construction to output conductor 69*d*. Moreover, the voltage from source 25*b* is also applied over conductor 49*d*, a wiper of autokey 36b and a circuit of that autokey to emerge on output conductor 80*e*. The voltage from source 26*a* which is applied over conductor 44*g* to a wiper of autokey 36a is applied through a fixed contact of that autokey to output conductor 79*a*. Similarly, the voltage from source 26*b* is applied over conductor 44*g* to a wiper of autokey 35b and then to output conductor 78*c*.

In like manner, voltage from source 27*b* is transferred to output conductor 73*c* of autokey 33a and to output conductor 72*b* of autokey 32b. Voltage from source 28*b* is impressed on output circuit 71*b* of autokey 32a and also on output 70*e* of autokey 31b. Source 29b delivers a potential to output conductor 77*d* of autokey 35a and also to output conductor 76*f* of autokey 34b. A voltage from source 30*b* is transferred over conductor 59*c* to output 75*a* of autokey 34a and to output 74*b* of autokey 33b.

Thus, in response to the registration of the number 374625 in key board 24, voltage is applied to conductors 69*d*, 70*e*, 71*b*, 72*b*, 73*c*, 74*b*, 75*a* 76*f* 77*d*, 78*c* 79*a*, and 80*e*, each of which conductors is connected to an assigned control contact of one of memory selectors 37–45 or to stepping switches 140–142. The selectors and stepping switches, therefore, respond to the voltage placed on their control contacts to assume corresponding positions. Each of the selectors establishes a connection from its wipers to a chosen one of the memory units connected to the column of contacts at the controlled position to single out the representation by that unit of the exact configuration of one of the indexing discs in the subscribers decoding mechanism. More particularly, selector 37 couples its wipers to the memory unit connected to the column of fixed contacts including the control contact connected to conductor 69*d* to introduce the characteristics of cam disc 11*b* of the mechanism for the subscriber having identification number 374625. Selector 38 introduces the transposition block or memory unit connected to the column of contacts associated with conductor 70*e* to present a representation of the configuration of cam disc 12*a*. In like fashion, memory units in transposition blocks 48–54 are coupled in circuit with the wipers of selectors 39–45, respectively, to introduce the characteristics of cam discs 12*b*, 13*a*, 13*b*, 14*a*, 14*b*, 15*a*, and 15*b*, respectively.

Stepping switches 140–142 assume positions dictated by their energized control contacts to simulate the transposition pattern found in the subscriber's transposition block 22f.

All of the parameters for the decoding mechanism for subscriber 374625 have now been determined. Considering now the effect of operating program selection keys D and 3, voltage from source 24*a* is applied over conductors 56*d* and 55*c* to a fixed control contact and a wiper, respectively, of program selector 67. This selector in response to the potential applied to the fixed control contact assumes an operating condition in which its wipers engage the column of contacts including that control contact. Potential from source 24a is therefore applied over conductor 55c, a wiper of selector 67, conductor 88c to a fixed control contact of code reader 68. Code reader 68 steps its wipers across to the position dictated by that active contact. Since the entire column of contacts under program designation D3 in master code patch board 66 is connected to the column of fixed contacts of code reader 68 in the position to which the selector has stepped, voltage from source 66j will be found on corresponding fixed contacts in reader 68. In other words, the potential condition of the column of contacts D3 of the patch board is duplicated on the column of contacts engaged by the wipers of the code reader. Thus, voltage from source 66j is applied through the wipers of code reader 68 to conductors 91a, 91d, 92b, 92d, 92e, 92f, 92g, 92l, 92n, 92q, and 92r. This voltage distribution pattern on the wires of cables 91h and 92h is a binary representation of the particular routing of the frequency bursts from the input to the output circuits for subscriber 374625 and of the cost for program D3.

The potential condition of conductors 91a–91d is transferred to one input of binary-to-decimal converter 77 to convert the binary representation thereof to a particular one of the nine possible costs. However, at this time there is no voltage on the vertical bar in patch board 77j and converter 77 is rendered unresponsive to the cost information. This particular subscriber is a charge subscriber and the voltage from source 25f which has been impressed over wiper 25e of substitution switch 25 to conductor 46f is not transferred to the vertical bars of patch board 77j because there is no cross connection thereto from conductor 46f. Thus, cost transposer 76 remains in its initial or "home" position shown in the drawing.

The voltage from source 66j which is applied to conductor 92b is further transferred through stepping switches 140, 141 and 142 to emerge on output conductor 110g. Similarly, the potential on conductors 92d, 92e, 92f, 92g, 92l, 92n, 92q, and 92r is transferred through the three stepping switches in input transposer 69 to appear respectively at output conductors 110c, 110j, 110p, 110a, 110e, 110r, 110k, and 110q. The pattern in which the potential from source 66j appears at the output conductors of input transposer 69 represents two "items" of information in binary form, namely, the particular one of code frequencies $f_1$–$f_5$ that is to be applied to each of switches 11–15 and also the particular position to which each of switches 11–15 must be adjusted in order to satisfy the required circuit interconnections between input circuits 22a–22e and output circuits 1″–7″ of the decoding mechanism as dictated by the column of contacts under program designation D3 in patch board 66.

It will be observed that output conductors 110c, 110j and 110p of transposer 69 lead directly to converter 71 which determines specific information for switch 11. If these conductors are followed back through the transpositions effected by unit 69 for the assumed operating condition, it is manifest that they receive through the wipers of transposer 69 the potential condition of conductors 92d, 92e and 92f of the code reader. Those conductors disclose the routing assignment of code frequency $f_2$ from which it is clear that switch 11 of the subscriber's decoding mechanism is to route this particular code signal frequency.

Since the illustrative example concerns itself with a subscriber who is not of the class referred to as "cost subscriber," no further transposition is introduced in cost transposer 76 so that by a similar process of following the remaining output conductors of input transposer 69 through the several transpositions of that unit the assignment of code signal frequencies to the remaining switches can be determined. For the case at hand it develops that switches 12, 13, 14 and 15 are respectively assigned code signal frequencies $f_5$, $f_1$, $f_4$ and $f_3$.

The binary information at the output of unit 69 is now converted into decimal form. The voltage on conductors 110c, 110j and 110p actuates relays 145–147 in binary-to-decimal converter 71. Thus, a positive voltage from source 149 is conveyed through the make contacts of switches 150, 151, and 154 to output conductor 112g which designates that switch 11 must be adjusted so that its incoming circuit and coding frequency $f_2$ is coupled to output circuit 7″.

The voltage on each of conductors 110k and 110q is translated through certain of the fixed contacts in cost transposer 76 to output conductors 117e and 117k respectively which in turn are connected to the input of converter 72. This converter responds thereto to develop a potential on output conductor 113f to indicate that switch 12 must connect its incoming circuit and coding frequency $f_5$ to output circuit 6″.

The voltage on conductor 110g is conveyed through cost transposer 76 to output conductor 117f and then to the input of converter 73 which develops a voltage on output conductor 114b to indicate that switch 13 should be adjusted to connect coding frequency $f_1$ to output circuit 2″.

The potential on conductors 110e and 110r is transferred through transposer 76 to output conductors 117c and 117m and then to the input of converter 74 which provides a voltage on output conductor 115e to indicate that switch 14 must be positioned such that its incoming circuit and coding frequency $f_4$ is translated to output circuit 5″.

The voltage on conductor 110a is translated through transposer 76 and output circuit 117d to the input of converter 75 to produce a potential on output conductor 116a to indicate that switch 15 must be positioned to direct coding frequency $f_3$ to output circuit 1″.

The potential conditions thus established on the output conductors of converters 71 to 75 are transferred to adders 56 to 60. Specifically, the voltage on conductor 112g of converter 71 is translated to a wiper of adder 56, and the potentials on output conductors 113f, 114b, 115e, and 116a from the remaining converters are applied respectively to selected wipers of adders 57–60 as shown.

The computer is now conditioned for the code building process, namely, a process involving a sequence of operating steps each of which determines the required setting for one of knobs 16–20 in the subscriber's decoding mechanism. A potential from source 25d is conveyed over wiper 25c in the 9th level of substitution switch 25 and over conductor 45f to a selected one of the horizontal bars of transposition block 55. For the selected bar, an interconnection is made to a vertical bar indicating that disc 11a for subscriber 374625 has a depth or active section numbered 4 engaging intersecting mechanism 11c, as shown in Figure 1. Adder 56 steps over to the position in which it engages a column of contacts including that designated 4 of block 55 to inform the computer, so to speak, that the subscriber's indexing disc 11a has been previously adjusted by the service man such that cam section 4 of disc 11a is active. Conductor 112g from converter 71 indicates to adder 56 that switch 11 must be adjusted so that incoming circuit 23b, which carries rectified frequency bursts $f_2$, is connected to output circuit 7″. The potential on conductor 112g is thus conveyed through the adder to emerge on output circuit 96c which indicates that cam section 3 of disc 11b is required in order that intersecting mechanism 11c, controlled conjointly by that disc and disc 11a, is operated properly to position switch 11 to output circuit 7″.

The next step that must be taken by the computer is to find the angular position of cam disc 11b which will place section or depth 3 into engagement with intersecting mechanism 11c. Accordingly, the potential on conductor 96c is translated to a wiper of selector 37, then over a selected vertical bar in the memory unit selected thereby to the horizontal bar which is interconnected thereto. According to the pattern of depths on disc 11b for subscriber 374625 as represented by the selected memory unit, position 6′ places the desired section or depth 3 into engagement with intersecting mechanism 11c. The voltage appearing on conductor 112g is conveyed over conductor 96c, and through selector 37 to output conductor 95f and to indicator lamp 61. This lamp displays the number 6, indicating to the operator that the subscriber's knob 16 must be adjusted to position 6′ in order to operate switch 11 properly.

When knob 16 is so adjusted, the subscriber's disc 12a will also be rotated since it is rigidly affixed to shaft 16a and thus the active section of disc 12a must be registered. This is achieved by conveying the voltage on conductor 95f to one of the wipers of selector 38 and then through selected vertical and horizontal bars of a chosen memory unit to conductor 97e. The selected memory unit indicates that when knob 16 is adjusted to position 6′, depth 5 of disc 12a is moved into engagement with intersecting mechanism 12c, as shown in Figure 1. The voltage on conductor 97e is transferred to a fixed control contact of adder 57 which causes rotation thereof to the vertical column of fixed contacts aligned with conductor 97e. Converter 72 translates a voltage over conductor 113f to a wiper of adder 57 to indicate that switch 12 must be adjusted to couple incoming circuit 23e to output circuit 6″. The voltage on conductor 113f is translated through the adder wherein an automatic computation is carried out to provide a voltage on conductor 99a indicating that section or depth 1 of disc 12b is required to effect operation of switch 12 to output circuit 6″. The potential on conductor 99a is translated through a wiper of selector 39, a selected vertical bar of the selected memory unit, and a horizontal bar to conductor 98b to indicate that for the particular configuration of cam disc 12b in the subscriber mechanism knob 17 must assume position 2′ to place section 1 into engagement with intersecting mechanism 12c, as shown by Figure 1. The potential on conductor 98b energizes indicator lamp 62 to display numeral 2, thereby to indicate to the operator that knob 17 must be adjusted to position 2′ to operate switch 12 properly.

In like fashion, the required settings of the remaining knobs 18—20 are determined. Briefly, the voltage on conductor 98b is transferred to a wiper of selector 40 and through a selected vertical bar of the selected memory unit and a horizontal bar thereof to conductor 101f indicating that depth 6 of disc 13a is placed into engagement with intersecting mechanism 13c when knob 17 is adjusted to position 2′. The voltage on conductor 101f is transferred to adder 58 to effect actuation thereof.

The voltage on conductor 114b from converter 73, indicating that switch 13 must be positioned to output circuit 2″, is translated to conductor 103c directing that a section 3 of disc 13b is required. It will be remembered that the switch 13, as are the other switches, is what is termed a "modulo seven" arrangement in that a desired one of its seven output circuits may be reached by adding two depths or sections which total to the number associated with that output circuit or by adding two depths which total to seven plus the number of that output circuit. Since section 6 of disc 13a is actively engaged with intersecting mechanism 13c and since the switch must be connected to output circuit 2, this may be achieved by employing section 3 of disc 13b.

The voltage on conductor 103c is conveyed through a wiper of selector 41 and selected vertical and horizontal bars of the selected memory unit to output conductor 102a and then to indicator lamp 63 to cause that lamp to display the number 1. This shows that knob 18 must be adjusted to position 1′ to operate switch 13 as required.

The voltage on conductor 102a is transferred to a wiper of selector 42 and then over particular vertical and horizontal bars of the selected memory unit to conductor 104c to indicate that when knob 18 is adjusted to position 1, depth 3 of disc 14a actively engages intersecting mechanism 14c, as shown in Figure 1. This information is conveyed to adder 59 to effect actuation thereof. A potential from converter 74 appears on conductor 115e, disclosing that switch 14 must be positioned to output circuit 5″, and is conveyed through adder 59 to output circuit 106b. This means that a depth 2 of disc 14b must be added to depth 3 of disc 14a to adjust switch 14 to output circuit 5″. The potential on conductor 106b is conveyed to a wiper of selector 43 and through particular vertical and horizontal bars in the selected memory unit to output conductor 105c and then to lamp 64 to indicate that for the particular configuration of disc 14b, knob 19 must be adjusted to position 3′.

The voltage on conductor 105c is also conveyed to a wiper of selector 44 and through selected vertical and horizontal bars to output conductor 107e, showing that when knob 19 is adjusted to position 3′, section 5 of disc 15a is moved into engagement with intersecting mechanism 15c. The potential on conductor 107e is conveyed to a control contact of adder 60 to effect actuation thereof. A potential appears on conductor 116a from converter 75 denoting that switch 15 must be positioned to output circuit 1″. A computation is carried out in adder 60 and a voltage appears on output circuit 108c dictating that a depth 3 of disc 15b will satisfy the requirement. The voltage on conductor 108c is conveyed to a wiper of selector 45 and then through a selected vertical bar of the memory unit representing the configuration of disc 15b and over a horizontal bar to output circuit 109g. The required setting for knob 20, namely position 7′ is conveyed to indicator lamp 65 which displays the number 7.

Now all of the indicator lamps 61–65 have been illuminated to display the code combination or knob setting pattern of 62137. The operator then passes this information along to the subscriber.

The operator may also make a notation to the effect that such information has been disseminated for program charging purposes. However, provision has been made in this computer to record automatically the pertinent details of the transaction. Specifically, potentials are impressed on conductors 47f, 50c, 64d, 66e, 60g and 68b, from substitution switches 25–30, respectively, and conveyed to decimal-to-binary converters 121–126, respectively, the outputs of which are supplied to tape perforator 82 to register a representation of the subscriber's identification number. The voltage on conductors 55*c* and 56*d* from the program keys in key board 24 is also conveyed through converters 127 and 128 to tape perforator 82 to register the particular program selected. Information relating to the cost of the program, which pertains to cost subscribers only, is conveyed from cost transposers 76 through converter 129 to tape perforator 82 to record the charge for the program selected. Of course, for the particular example described cost transposer 76 was not employed since the illustrative subscriber was not a cost subscriber and no charge would be recorded in tape perforator 82. Billing may be determined in that case by checking the recorded information pertaining to the programs selected. Alternatively the cost information from code reader 68 could be supplied to the tape perforator independently of the cost transposer to make a billing record for all classes of subscribers.

Since some of the operations in the computer must necessarily take place only after a previous operation has been completed, provision must be made to achieve sequential actuation of some of the stepping switches. Inasmuch as the switches are of conventional construction, it is a relatively simple matter to deny operating voltage to such switches until the pre-requisite computer operations have been carried out. Operating voltage for substitution switches 25–30, autokeys 31a–36b, program selector 67, and code reader 68 may be provided during or immediately subsequent to the registration of the subscriber's identification number and program selection. Operating voltage is then applied sequentially to memory selectors 37–45, stepping switches 140–142, cost transposer 76, adder 56, adder 57, adder 58, adder 59, and adder 60. Such sequential application of operating voltage to the various stepping switches may be achieved by the use, for example, of another rotary stepping switch which is initiated by the operator so that voltage is applied as required. The circuitry for insuring the multi-step operation of the computer has been omitted to avoid unduly encumbering the drawings.

Moreover, circuitry for "homing" all the various stepping switches back to their respective reference conditions has been omitted from the drawings for purposes of simplicity since such circuitry may be entirely conventional in construction and may be actuated by the operator after the computer has executed a complete cycle of operations and displayed a required pattern of knob settings.

The computer may also be employed in a "reverse sense." Instead of registering a subscriber's identification number to determine the particular shapes of the indexing discs found in his transposition mechanism and then to determine the knob adjustments required to view a particular program, it is possible to utilize the computer to select the configuration of each of the discs required for a subscriber having a given identification number. To elucidate, any six-digit number may be registered into key board 24 to effect actuation of the substitution switches, autokeys, selectors and the input transposer. Dials may be attached to the selectors and input transposer to indicate the particular position assumed by these switches in response to the registration of that six-digit number. Consequently, the memory unit selected by each of the selectors may be observed to indicate the configuration of the various indexing discs required in a transposition mechanism designated by the registered six-digit combination. Moreover, the required transposition pattern for block 22f will be indicated by the positions assumed by switches 140–142. A switching mechanism may then be provided having such indexing discs and transposition pattern in block 22f; thence forth the switching mechanism will be associated with that registered number.

By way of summary, the description television computer of the present invention determines the adjustment of a decoding mechanism (shown in Figure 1) which has a plurality of operating positions, namely, the various combinations of positions of knobs 16–20 and consequently indexing cam discs 11*b*–15*b* and 12*a*–15*a*, each of which positions establishes a predetermined code condition. Specifically, for any given pattern of knob settings switches 11–15 assume a family of positions which effects a particular interconnection between the input circuits and the output circuits. The computer comprises means (key board 24, patch board 66, program selector 67 and code reader 68) for providing information representing a selected code condition (namely, a selected pattern of circuit interconnections between the input circuits and the output circuits) that must be established in the decoding mechanism of Figure 1 to effect decoding of a given subscription television program. The computer also includes means (key board 24, substitution switches 25–30, autokeys 31a–36b, selectors 37–45, and transposition blocks 46–55) for providing information representing the correlation between operating positions and code conditions of the decoding mechanim. Control apparatus which includes input transposer 69, cost transposer 76, binary-to-decimal converters 71–75, adders 56–60, and indicator lamps 61–65, responds to the information from both means for determining the particular operating position of the decoding mechanism required to establish the selected code condition.

While a particular embodiment of the invention has been shown and described, modifications may be made, and it is intended in the appended claims to cover all such modifications as may fall within the true spirit and scope of the invention.

I claim:

1. A subscription television computer for determining the adjustment of a decoding mechanism having a plurality of operating positions each of which establishes a predetermined code condition, said computer comprising: program selection means for providing information representing a selected code condition that must be established in said decoding mechanism to effect decoding of a given subscription television program; decoder identification means for providing information representing the correlation between operating positions and code conditions of said decoding mechanism; and control apparatus responsive to said information from both said means for determining the particular operating position of said decoding mechanism required to establish said selected code condition.

2. A subscription television computer for determining the adjustment of a decoding mechanism including a series of manually adjustable elements collectively having a plurality of operating positions in accordance with their relative instantaneous adjustments, each of which operating position establishes a predetermined code condition, said computer comprising: program selection means for providing information representing a selected code condition that must be established in said decoding mechanism to effect decoding of a given subscription television program; decoder identification means for providing information representing the correlation between operating positions of such elements and code conditions of said decoding mechanism; and control apparatus responsive to said information from both said means for determining the particular adjustment of each of said elements required to establish said selected code condition.

3. A subscription television computer for determining the adjustment of a decoding mechanism including a series of movable code-determining devices and having a plurality of operating positions in each of which said code-determining devices collectively assume a prescribed code pattern to establish said decoding mechanism in a corresponding predetermined code condition, said computer comprising: program selection means for providing information representing a selected code condition and the corresponding code pattern of said code-determining devices that must be established in said decoding mechanism to effect decoding of a given subscription television program; decoder identification means for providing information representing the correlation between operating positions and code conditions of said decoding mechanism; and control apparatus responsive to said information from both said means for determining the particular operating position of each of said devices of said decoding mechanism required to establish said selected code condition.

4. A subscription television computer for determining the adjustment of a decoding mechanism having a plurality of operating positions each of which establishes a predetermined code condition, said computer comprising: storage apparatus for storing information representing the code condition that must be established in said decoding mechanism to effect decoding of a particular subscription television program; means coupled to said storage apparatus for reading the information stored therein; decoder identification means for providing information representing the correlation between operating positions and code conditions of said decoding mechanism; and control apparatus responsive to said information from both said means for determining the particular operating position of said decoding mechanism required to establish that code condition necessary to decode said program.

5. A subscription television computer for determining the adjustment of a decoding mechanism having a plurality of operating positions each of which establishes a predetermined code condition, said computer comprising: first storage apparatus for storing information representing the code condition that must be established in said decoding mechanism to effect decoding of a particular subscription television program; means coupled to said first storage apparatus for reading the information stored therein; second storage apparatus for storing information representing the correlation between operating positions and code conditions of said decoding mechanism; means for reading the information stored in said second storage apparatus; and control apparatus responsive to said information from both said means for determining the particular operating position of said decoding mechanism required to establish that code condition necessary to decode said program.

6. A subscription television computer for determining the adjustment of a decoding mechanism assigned to a particular one of a relatively large number of subscribers and having a plurality of operating positions each of which establishes a predetermined code condition, said computer comprising: program selection means for registering program selection information representing a selected code condition that must be established in said decoding mechanism to effect decoding of a given subscription television program; decoder identification means for registering subscriber identification information representing the correlation between operating positions and code conditions of said decoding mechanism; and control apparatus responsive to the registration of said information by both said means for determining the particular operating position of said decoding mechanism required to establish said selected code condition.

7. A subscription television computer for determining the adjustment for each of a relatively large number of decoding mechanisms individually assigned to a different subscriber and having a plurality of operating positions each of which establishes a predetermined code condition in accordance with a correlation pattern which is different for each decoding mechanism, said computer comprising: program selection means for registering program selection information representing a selected code condition that must be established in any of said decoding mechanisms to effect decoding of a given subscription television program; storage apparatus for storing information representing the correlation patterns for all of said decoding mechanisms; means coupled to said storage apparatus for registering an identification of a selected subscriber to derive information pertaining to the particular correlation pattern of the decoding mechanism assigned to that selected subscriber; and control apparatus responsive to said information from both said means for determining the particular operating position of the decoding mechanism assigned to the selected subscriber required to establish said selected code condition.

8. A subscription television computer for determining the adjustment of a decoding mechanism having a plurality of operating positions which are correlated with a corresponding plurality of code conditions in accordance with a particular selected one of a relatively large number of possible correlation patterns, said computer comprising: storage apparatus for storing information representing the code condition that must be established in said decoding mechanism to effect decoding of each of a number of different subscription television programs; means coupled to said storage apparatus for selecting the information pertaining to one of the programs to ascertain the code condition necessary to decode the selected program; additional storage apparatus for storing information representing each one of the possible correlation patterns; means coupled to said additional storage apparatus for deriving the information pertaining to the selected correlation pattern assigned to said decoding mechanism; and control apparatus responsive to said information from both said means for determining the particular operating position of said decoding mechanism required to establish that code condition necessary to decode the selected program.

9. A subscription television computer for determining the adjustment of a decoding mechanism, assigned to a particular selected one of a relatively large number of subscribers, having a plurality of operating positions each of which establishes a predetermined code condition and having a number of distinguishing characteristics determining the correlation between the operating positions and code conditions, said computer comprising: program selection means for providing information representing a selected code condition that must be established in said decoding mechanism to effect decoding of a given subscription television program; decoder identification means responsive to the registration of a subscriber identification number assigned to said selected subscriber and having a number of digits less than the number of distinguishing characteristics to provide information representing said characteristics and thereby representing the correlation between operating positions and code conditions of said decoding mechanism; and control apparatus responsive to said information from both said means for determining the particular operating position of said decoding mechanism required to establish said selected code condition.

10. A subscription television computer for determining the adjustment of a decoding mechanism, assigned to a selected one of a relatively large number of subscribers, having a plurality of operating positions each of which establishes a predetermined code condition and having a number of predetermined distinguishing characteristics, representing a selected one of a large number of possible patterns, determining the correlation between the operating positions and code conditions, said computer comprising: program selection means for providing information representing a selected code condition that must be established in said decoding mechanism to effect decoding of a given subscription television program; means responsive to the registration of a subscriber identification number assigned to said selected subscriber and having a number of digits less than the number of distinguishing characteristics to provide a number of "bits" of information, greater than the number of digits, which specify the distinguishing characteristics of said decoding mechanism; storage apparatus for storing information representing several possible patterns of distinguishing characteristics; means for utilizing said "bits" of information to derive from said storage apparatus information pertaining to said predetermined distinguishing characteristics; and control apparatus responsive to the information from both said first- and last-mentioned means for determining the particular operating position of said decoding mechanism required to establish said selected code condition.

11. A subscription television computer for determining the adjustment of a decoding mechanism, assigned to a selected one of a relatively large number of subscribers, having a plurality of operating positions each of which establishes a predetermined code condition and having a number of predetermined distinguishing characteristics, representing a selected one of a large number of possible patterns, determining the correlation between the operating positions and code conditions, said computer comprising: means for providing information representing a selected code condition that must be established in said decoding mechanism to effect decoding of a given subscription television program; substitution means responsive to the registration of a subscriber identification number assigned to said selected subscriber and having a number of digits less than the number of distinguishing characteristics effectively to provide a representation of a completely different substitute number having the same number of digits; adding means responsive to the representation of the substitute number for effectively adding the digits of the substitute number in various combinations to provide a number of "bits" of information, greater than the number of digits in the substitute number, which represent the distinguishing characteristics of said decoding mechanism; storage apparatus representing several possible patterns of distinguishing characteristics; means for utilizing said "bits" of information to derive from said storage apparatus information pertaining to said predetermined distinguishing characteristics; and control apparatus responsive to said information from both said first and last-mentioned means for determining the particular operating position of said decoding mechanism required to establish said selected code condition.

12. A subscription television computer for determining the adjustment for each of a relatively large number of decoding mechanisms for each of several different subscription television programs where each decoding mechanism is assigned to a different subscriber and has a set of distinguishing characteristics unique to the assigned subscriber such that the adjustment required for any given subscriber to establish a predetermined code condition in his assigned decoding mechanism is different from that required of the other subscribers to establish the same condition, and where the adjustment for that same given subscriber is also different to establish different code conditions for each program, said computer comprising: program selection means for registering program selection information representing a selected code condition that must be established to decode a selected one of the different programs; decoder identification means for registering subscriber identification information representing the unique set of characteristics for a selected one of the decoding mechanisms effectively to establish a simulation of the selected decoding mechanism in said computer; and control apparatus responsive to the registered program selection and identification information to determine the adjustment required for the selected decoding mechanism to realize decoding of the selected program.

13. A subscription television computer for determining the adjustment for each of a relatively large number of decoding mechanisms for each of several different subscription television programs where each decoding mechanism is assigned to a different subscriber and has a set of distinguishing characteristics unique to the assigned subscriber, and selected from a large number of possible sets, such that the adjustment required for any given subscriber to establish a predetermined code condition in his assigned decoding mechanism is different from that required of the other subscribers to establish the same code condition, and where the adjustment for that same given subscriber is also different to establish different code conditions for each program, said computer comprising: storage apparatus for storing information representing the code condition that must be established to decode each one of the several different subscription television programs; means coupled to said storage apparatus for selecting the information pertaining to a selected program; additional storage apparatus for storing information representing all possible sets of distinguishing characteristics; means coupled to said additional storage apparatus for selecting the information pertaining to the set of characteristics assigned to a selected subscriber; and control apparatus responsive to the registered program selection and identification information to determine the adjustment required for the decoding mechanism assigned to the selected subscriber to realize decoding of the selected program.

14. A subscription television computer for determining the adjustment of a decoding mechanism including a movable code-determining device and a pair of independently, manually adjustable elements individually having a plurality of positions and collectively controlling the position of said code-determining device to establish several different code conditions, said computer comprising: program selection means for providing information representing a selected code condition that must be established in said decoding mechanism to effect decoding of a given subscription television decoder identification program; means for providing information representing the correlation between the positions of said adjustable elements and the code conditions established by said code-determining device; and control apparatus responsive to said information from both said means for determining the particular position to which one of said adjustable elements must be adjusted, when the other element is already established in a given position, in order to actuate said code-determining device such that it establishes said selected code condition.

15. A subscription television computer for determining the adjustment of a decoding mechanism including a movable code-determining device for establishing different code conditions, a movable actuating mechanism coupled to said code-determining device for determining the position thereof, first and second independently, manually adjustable multi-section indexing devices individually presenting in each position of adjustment an operative section for exerting a driving effect determined by its assigned value within a predetermined range of values of a particular characteristic of the operative section, and collectively driving said actuating mechanism to establish said code-determining device in a selected one of its positions in accordance with the conjoint driving effects exerted by the operative sections of both said indexing devices, different sections of said multi-section indexing devices having different assigned values of said characteristic within said predetermined range, said computer comprising: program selection means for providing information representing a selected position to which said code-determining device must be moved to effect decoding of a given subscription television program; decoder identification means for providing information representing the correlation between the positions of said first and second indexing devices and said code-determining device; means coupled to said decoder identification means for determining the operative section of said first indexing device when said first device is adjusted to a predetermined position; means coupled to all three of said aforementioned means for determining the operative section required on the part of said second indexing device to effect actuation of said code-determining device to said selected position; and means coupled to said decoder identification means for determining the particular position of said second indexing device which places the required section in operation.

16. A subscription television computer for determining the adjustment of a multi-position decoding mechanism having a series of input circuits and a series of output circuits and in each position establishing a predetermined pattern of interconnections between said input and output circuits, said computer comprising: program selection means for providing information representing a selected pattern of circuit interconnections that must be established in said decoding mechanism to effect decoding of a given subscription television program; decoder identification means for providing information representing the correlation between positions and interconnection patterns of said decoding mechanism; and control apparatus responsive to said information from both said means for determining the particular position of said decoding mechanism required to establish said selected pattern.

17. A subscription television computer for determining the adjustment of each of a relatively large number of multi-position decoding mechanisms individually having a series of input circuits and a series of output circuits and in each position establishing a predetermined pattern of interconnections between said input and output connections, each of said decoding mechanisms also having a transposer introducing a fixed transposition to its input circuits that is unique for each decoding mechanism, said computer comprising: program selection means for providing information representing a selected pattern of circuit interconnections that must be established in each decoding mechanism to effect decoding of a given subscription television program; decoder identification means for providing information representing the correlation between positions and interconnection patterns of a selected one of said decoding mechanisms; means for providing information representing the particular unique transposition introduced by the transposer in said selected decoding mechanism; and control apparatus responsive to all three aforementioned means for determining the particular position of said decoding mechanism required to establish said selected pattern.

18. A subscription television computer for determining the adjustment of a multi-position decoding mechanism having a series of input circuits and a series of output circuits and in each position establishing a predetermined pattern of interconnections between said input and output circuits and also having a coin-controlled variable transposer introducing a selected one of several different transpositions to said input circuits in accordance with the number of coins deposited, said computer comprising: means for providing information representing a selected pattern of circuit interconnections that must be established in said decoding mechanism to effect decoding of a given subscription television program; means for providing information representing the correlation between positions and interconnection patterns of said decoding mechanism; means for providing information representing a particular transposition that must be introduced by said transposer for said selected program, as determined by the cost for said selected program; and control apparatus responsive to said information from all three aforementioned means for determining the particular position of said decoding mechanism required to establish said selected pattern after a predetermined number of coins commensurate with the cost of the selected program has been deposited in the coin-controlled transposer.

References Cited in the file of this patent

UNITED STATES PATENTS

| | | |
|---|---|---|
| 2,052,708 | Hammond | Sept. 1, 1936 |
| 2,348,680 | Hanson et al. | May 9, 1944 |
| 2,377,205 | Buckley | May 29, 1945 |
| 2,573,349 | Miller | Oct. 30, 1951 |
| 2,577,141 | Mauchly et al. | Dec. 4, 1951 |
| 2,689,082 | Kolisch | Sept. 14, 1954 |
| 2,812,509 | Phelps | Nov. 5, 1957 |